United States Patent
Chen et al.

(10) Patent No.: US 9,014,024 B2
(45) Date of Patent: Apr. 21, 2015

(54) DEVICES FOR DETERMINING A REFERENCE SUBFRAME AND DETERMINING A MODE

(75) Inventors: Wanshi Chen, San Diego, CA (US); Peter Gaal, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 13/251,788

(22) Filed: Oct. 3, 2011

(65) Prior Publication Data
US 2012/0082049 A1   Apr. 5, 2012

Related U.S. Application Data

(60) Provisional application No. 61/389,591, filed on Oct. 4, 2010.

(51) Int. Cl.
*H04W 24/00* (2009.01)
*H04W 24/10* (2009.01)

(52) U.S. Cl.
CPC ................................. *H04W 24/10* (2013.01)

(58) Field of Classification Search
CPC .................................................... H04W 24/10
USPC .......... 370/252, 241, 328–338; 455/450–454, 455/436–444
See application file for complete search history.

(56) References Cited

U.S. PATENT DOCUMENTS

| | | |
|---|---|---|
| 2008/0165698 A1 | 7/2008 | Dalsgaard et al. |
| 2008/0253336 A1 | 10/2008 | Parkvall et al. |
| 2010/0080139 A1 | 4/2010 | Palanki et al. |
| 2010/0150114 A1* | 6/2010 | Che .............................. 370/336 |
| 2010/0202311 A1* | 8/2010 | Lunttila et al. ................ 370/252 |
| 2011/0038285 A1 | 2/2011 | Kwon et al. |
| 2011/0116437 A1 | 5/2011 | Chen et al. |
| 2011/0199944 A1 | 8/2011 | Chen et al. |

(Continued)

FOREIGN PATENT DOCUMENTS

| | | |
|---|---|---|
| WO | 2010103886 A1 | 9/2010 |
| WO | 2010106729 A1 | 9/2010 |
| WO | 2010110588 A2 | 9/2010 |

OTHER PUBLICATIONS

ETSI TS 136 213 V10.1.0 Apr. 2011, Cover, pp. 61-63.*

(Continued)

*Primary Examiner* — Thai Hoang
*Assistant Examiner* — Kenneth P Hunt
(74) *Attorney, Agent, or Firm* — Austin Rapp & Hardman

(57) ABSTRACT

A wireless communication device for determining a reference subframe is described. The wireless communication device includes a processor and instructions stored in memory that is in electronic communication with the processor. The wireless communication device determines a reporting subframe n. The wireless communication device also determines a reference subframe $n-n_{reference}$ based on a limit and at least one limiting criterion. The wireless communication device further generates a report based on the reference subframe if the reference subframe is determined. The wireless communication device additionally sends the report during the reporting subframe if the reference subframe is determined.

48 Claims, 16 Drawing Sheets

(56) References Cited

U.S. PATENT DOCUMENTS

2011/0222411 A1 9/2011 Koskinen et al.
2012/0076040 A1* 3/2012 Hoshino et al. ............... 370/252

OTHER PUBLICATIONS

3GPP TS 36.213 Version 8.8.0 Release 8, Oct. 2009.*
Texas Instruments, Ericsson,"R1-084036 CQI Reference Resource in the Time Domain," Sep. 29-Oct. 3, 2008, 3GPP TSG RAN WG1 54bis.*
Ericsson: "Finalizing the CQI Definition", 3GPP Draft; R1-082465, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; Jun. 25, 2008, XP050110736, [retrieved on Jun. 25, 2008].
International Search Report and Written Opinion—PCT/US2011/054700—ISA/EPO—Jan. 1, 2012.
Panasonic: "Correction for Aperiodic CQI Reporting", 3GPP Draft; R1-084237, 3rd Generation Partnership Project (3GPP), Mobile Competence Centre ; 650, Route Des Lucioles ; F-06921 Sophia-Antipolis Cedex; France, No. Prague, Czech Republic; Nov. 4, 2008, XP050317523, [retrieved on Nov. 4, 2008] Section 7.2.3.
Panasonic et al: "CQI/PMI reference measurement periods", 3GPP Draft; R1-084039, 3rd Generation Partnership Project (3GPP), Mobile Competence Centre; 650, Route Des Lucioles; F-06921 Sophia-Antipolis Cedex; France, No. Prague, Czech Republic; Oct. 6, 2008, XP050317333, [retrieved on Oct. 6, 2008], Section 7.2.3.
Philips: "CQI/PMI reference measurement periods", 3GPP Draft; R1-082528, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; Jun. 25, 2008, XP050110793, [retrieved on Jun. 25, 2008].
Texas Instruments et al.,"CQI Reference Resource in the Time Domain", 3GPP Draft; R1-084036 TI CQI Timing Rev, 3rd Generation Partnershi P Project (3GPP), Mobile Competence Centre ; 650, Route Des Lucioles ; F-06921 Sophia-Anti Pol1 S Cedex; France, No. Prague, Czech Republic; Oct. 6, 2008, XP050317332, [retrieved on Oct. 6, 2008].

\* cited by examiner

DEVICES FOR DETERMINING A REFERENCE SUBFRAME AND DETERMINING A MODE

RELATED APPLICATIONS

This application is related to and claims priority from U.S. Provisional Patent Application Ser. No. 61/389,591 filed Oct. 4, 2010, for "DETERMINING A REFERENCE SUBFRAME."

TECHNICAL FIELD

The present disclosure relates generally to electronic devices. More specifically, the present disclosure relates to devices for determining a reference subframe and determining a mode.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smart phones, computers, etc.) communicate with other electronic devices. For example, a cellular phone may wirelessly communicate with a base station by transmitting and receiving electromagnetic signals over the air.

The quality of communications between wireless communication devices depends on the quality of the channel used to transmit and receive signals. For example, interference in the channel may degrade communication quality. Some electronic devices (e.g., wireless communication devices) use feedback to improve communication quality. For example, a cellular phone may send feedback to a base station, indicating measurements that the base station may use to improve link quality. As can be observed from this discussion, systems and methods that improve feedback may be beneficial.

SUMMARY

A wireless communication device for determining a reference subframe is described. The wireless communication device includes a processor and instructions stored in memory that is in electronic communication with the processor. The wireless communication device determines a reporting subframe n. The wireless communication device also determines a reference subframe $n-n_{reference}$ based on a limit and at least one limiting criterion. The wireless communication device further generates a report based on the reference subframe if the reference subframe is determined. The wireless communication device additionally sends the report during the reporting subframe if the reference subframe is determined.

The limit may be 4 and $n_{reference}$ may be a smallest value greater than or equal to the limit that corresponds to a valid downlink subframe. The at least one limiting criterion may include aperiodic triggering. The at least one limiting criterion may also include an upper limit.

The limit may be L and $n_{reference}$ may be a smallest value greater than or equal to the limit that corresponds to a valid downlink subframe. The at least one limiting criterion may include limiting L to a difference between the reporting subframe n and a downlink control information subframe. The at least one limiting criterion may also include an upper limit.

The limit may be 4 and $n_{reference}$ may be a smallest value greater than or equal to the limit that corresponds to a valid downlink subframe. The at least one limiting criterion may include limiting $n_{reference}$ to a value that is less than or equal to a difference between the reporting subframe n and a downlink control information subframe.

The limit may be 4 and $n_{reference}$ may be a smallest value greater than or equal to the limit that corresponds to a valid downlink subframe. The at least one limiting criterion may include limiting $n_{reference}$ to a value such that $n-n_{reference}$ corresponds to a downlink control information subframe number or corresponds to a predetermined subframe number.

The limit may be k and $n_{reference}$ may be a smallest value greater than or equal to the limit that corresponds to a valid downlink subframe. The at least one limiting criterion may include limiting $n_{reference}$ to a value that is less than or equal to a difference between the reporting subframe n and a downlink control information subframe. k may be limited to a minimum value.

The limit may be k and $n_{reference}$ may be a smallest value greater than or equal to the limit that corresponds to a valid downlink subframe. The at least one limiting criterion may include a downlink subframe that includes a channel state information reference signal.

The limit may be $k_1$ and $n_{reference}$ may be greater than or equal to the limit and may correspond to a first valid downlink subframe. The at least one limiting criterion may include a channel state information reference signal. The wireless communication device may also determine a second reference subframe $n-n_{reference2}$ based on a second limit. The second limit may be $k_2$ and $n_{reference2}$ may be greater than or equal to the second limit and may correspond to a second valid downlink subframe.

The limit may be k and $n_{reference}$ may be a smallest value greater than or equal to the limit that corresponds to a valid downlink subframe. The at least one limiting criterion may include a downlink subframe that is a certain subframe type.

The limit may be $k_1$ and $n_{reference}$ may be a smallest value greater than or equal to the limit that corresponds to a valid downlink subframe of a certain subframe type. The at least one limiting criterion may include using a downlink subframe of a certain type. The wireless communication device may also determine a second reference subframe $n-n_{reference2}$ based on a second limit. The second limit may be $k_2$ and $n_{reference2}$ may be a value greater than or equal to the second limit that corresponds to a second valid downlink subframe.

A base station for determining a mode is also described. The base station includes a processor and instructions stored in memory that is in electronic communication with the processor. The base station determines a feedback mode. The base station sends a feedback mode indicator. The base station also sends a reference signal. The base station further receives feedback.

The reference signal may be a common reference signal (CRS). The reference signal may be a channel state information reference signal (CSI-RS).

A method for determining a reference subframe on a wireless communication device is also described. The method includes determining a reporting subframe n. The method also includes determining a reference subframe $n-n_{reference}$ based on a limit and at least one limiting criterion. The method further includes generating a report based on the reference subframe if the reference subframe is determined. The method additionally includes sending the report during the reporting subframe if the reference subframe is determined.

A method for determining a mode on a base station is also described. The method includes determining a feedback mode. The method also includes sending a feedback mode indicator. The method further includes sending a reference signal. The method additionally includes receiving feedback.

An apparatus for determining a reference subframe is also described. The apparatus includes means for determining a reporting subframe n. The apparatus also includes means for determining a reference subframe $n-n_{reference}$ based on a limit and at least one limiting criterion. The apparatus further includes means for generating a report based on the reference subframe if the reference subframe is determined. The apparatus additionally includes means for sending the report during the reporting subframe if the reference subframe is determined.

An apparatus for determining a mode is also described. The apparatus includes means for determining a feedback mode. The apparatus also includes means for sending a feedback mode indicator. The apparatus further includes means for sending a reference signal. The apparatus additionally includes means for receiving feedback.

A computer-program product for determining a reference subframe is also described. The computer-program product includes a non-transitory tangible computer-readable medium with instructions. The instructions include code for causing a wireless communication device to determine a reporting subframe n. The instructions also include code for causing the wireless communication device to determine a reference subframe $n-n_{reference}$ based on a limit and at least one limiting criterion. The instructions additionally include code for causing the wireless communication device to generate a report based on the reference subframe if the reference subframe is determined. The instructions further include code for causing the wireless communication device to send the report during the reporting subframe if the reference subframe is determined.

A computer-program product for determining a mode is also described. The computer-program product includes a non-transitory tangible computer-readable medium with instructions. The instructions include code for causing a base station to determine a feedback mode. The instructions also include code for causing the base station to send a feedback mode indicator. The instructions further include code for causing the base station to send a reference signal. The instructions additionally include code for causing the base station to receive feedback.

DETAILED DESCRIPTION

Figure 1:
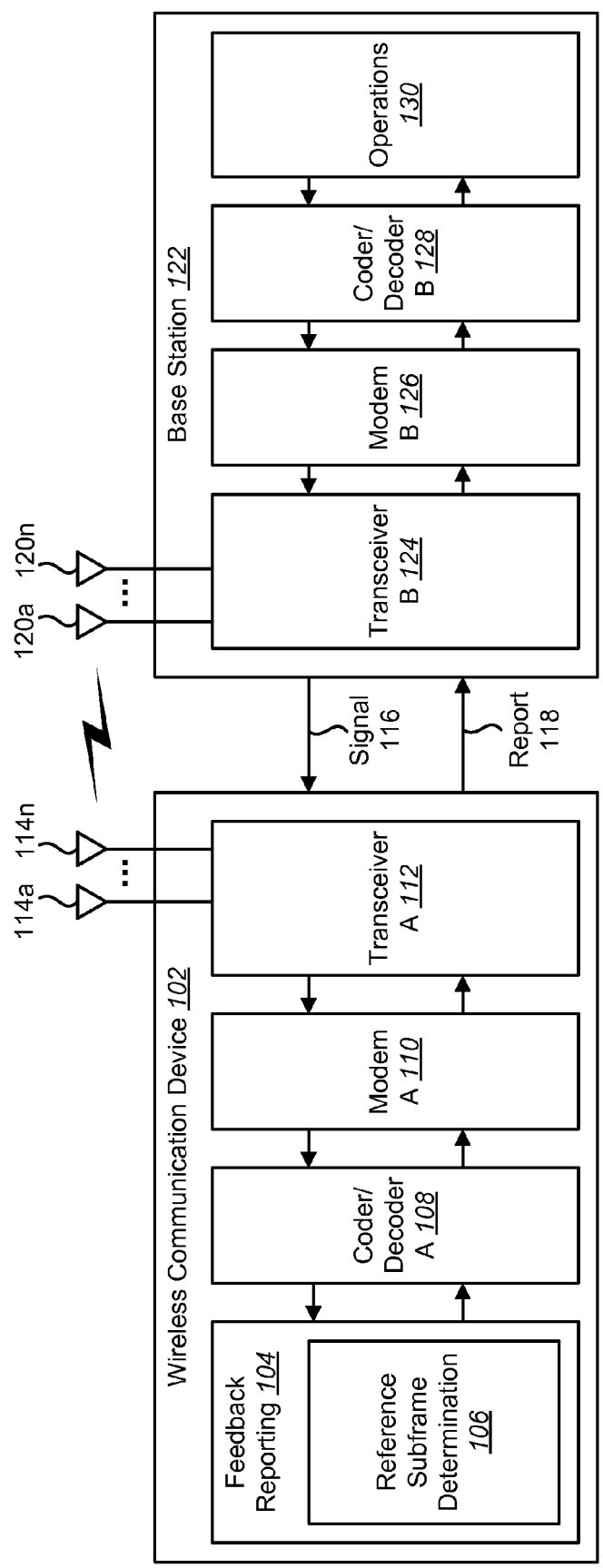
FIG. 1 is a block diagram illustrating one configuration of a wireless communication device in which systems and methods for determining a reference subframe may be implemented.

It should be noted that the systems and methods disclosed herein may be described in terms of one or more specifications, such as the 3rd Generation Partnership Project (3GPP) Release-8 (Rel-8), 3GPP Release-9 (Rel-9), 3GPP Release-10 (Rel-10), Long-Term Evolution (LTE), LTE-Advanced (LTE-A), etc. However, at least some of the concepts described herein may be applied to other wireless communication systems. For example, the term User Equipment (UE) may be used to refer to the more general term "wireless communication device." Furthermore, one or more of the terms Node B, Evolved Node B (eNB), Home Evolved Node B (HeNB), etc. may be used to refer to the more general term "base station."

In one configuration, the systems and methods disclosed herein may describe determining a measurement or reference subframe for Channel Quality Indicator (CQI)/Channel State Information (CSI) (e.g., feedback) reporting in LTE-A. In Release-8 and Release-9, both periodic and aperiodic Channel Quality Indicator, Precoding Matrix Indicator and/or Rank Indicator (CQI/PMI/RI) reporting are supported. Although the systems and methods may be described in terms of CQI for understanding, the systems and methods described herein may be similarly applicable to PMI and/or RI.

Each report is measured based on some reference resource (e.g., frequency and time resource, for example). From a time perspective (for a channel quality report in subframe n, for example), the reference resource may be defined or determined by a single downlink subframe $n-n_{reference}$ (e.g., $n-n_{CQI\_ref}$), where n is a subframe number. In some configurations, a radio frame may include 10 subframes. According to current specifications, for periodic CQI reporting, $n_{CQI\_ref}$ is the smallest value greater than or equal to 4, such that it corresponds to a valid downlink subframe. Additionally, for aperiodic CQI reporting, $n_{CQI\_ref}$ is such that the reference resource is in the same valid downlink subframe as the corresponding CQI request in a downlink control information (DCI) format 0. Furthermore, for aperiodic CQI reporting, is equal to 4 and the downlink subframe $n-n_{CQI\_ref}$ corresponds to a valid $n_{CQI\_ref}$ downlink subframe, where the downlink subframe n−n$_{CQI\_ref}$ is received after the subframe with the corresponding CQI request in a Random Access Response Grant.

In some configurations, a downlink subframe may be considered "valid" if it is configured as a downlink subframe for that wireless communication device (e.g., UE), it is not a Multicast/Broadcast over a Single Frequency Network (MBSFN) subframe, it does not contain a Downlink Pilot Time Slot (DwPTS) field (in the case the length of DwPTS is 7680*Ts and less) and it does not fall within a configured measurement gap for that wireless communication device (e.g., UE). If there is no valid downlink subframe for the CQI reference resource, CQI reporting is omitted in uplink subframe n.

For aperiodic CQI reporting, the corresponding Downlink Control Information (DCI) for Uplink (UL) grants (in DCI format 0, DCI format 4 or any future DCI formats introduced in LTE-A for UL grants, for example) may transmit in an invalid subframe. This may occur, for instance, for Common Reference Signal (CRS)-based reporting, if the subframe is a MBSFN subframe where CRS is not present in the data region. This may also occur, for example, for Channel State Information-Reference Signal (CSI-RS)-based reporting, if the subframe does not contain CSI-RS. In some configurations, however, it should be noted that subframes not containing CSI-RS could also be defined valid. Additionally or alternatively, interference may be measured in the reference subframe, while the channel may be measured in a most recent CSI-RS subframe. In some configurations, interference and channel may be measured in different subframes. It should be noted that a CSI-RS may include a subset of information used for feedback. For instance, a CRS may include information for determining both channel feedback and interference feedback. In one configuration a CSI-RS may include information for determining only interference feedback or channel feedback.

Alternatively, for aperiodic CQI reporting, the corresponding DCI for UL grants (e.g., DCI format 0, or any new DCI formats introduced in LTE-A for UL grants) may transmit in a subframe that is inappropriate for a CQI reference. This may occur, for instance, if cross-subframe scheduling is used (where a Physical Downlink Control Channel (PDCCH) scheduling a Physical Uplink Shared Channel (PUSCH) is sent in a subframe with a timing relationship different from that in Release-8, for example). It should be noted that a different subframe from a PDCCH subframe may be more appropriate for a CQI reference.

The same approaches discussed above may be applicable to periodic reporting. For example, for channel state information reference signal (CSI-RS)-based reporting, similar reference subframe(s) can be defined. The systems and methods disclosed herein may be described in terms of aperiodic reporting. However, the same or a similar design may be applicable to periodic reporting. One specific example is given as follows.

In a half-duplex relay, where a Relay Node (RN) cannot transmit and receive simultaneously, the RN should configure MBSFN subframes when it receives downlink backhaul from a donor eNB. In other words, a downlink backhaul subframe at the RN has to be an MBSFN subframe. In these MBSFN subframes, the RN may transmit control in the first one or two control symbols (for UEs directly connected to the RN or "access link" UEs, for example), switch from transmission to reception, receive Downlink (DL) backhaul information (both control and data) from the donor eNB and switch back from reception to transmission.

UL scheduling may be performed in the control region of these MBSFN subframes. If the same Rel-8 aperiodic CQI reference subframe is defined, aperiodic CQI cannot be reported for DCI sent in these MBSFN subframes. For Time-Division Duplexing (TDD), these MBSFN subframes may be intensively used for UL scheduling in order to maintain the same Rel-8 Hybrid Automatic Repeat Request (H-ARQ) timing relationship for access link UEs. This may be a potentially severe limitation on the possibility of having aperiodic CQI reporting.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a wireless communication device 102 (e.g., UE) in which systems and methods for determining a reference subframe may be implemented. The wireless communication device 102 may communicate with a base station 122 (e.g., eNB). For example, the wireless communication device 102 and base station 122 may communicate with each other by transmitting and/or receiving electromagnetic signals.

The wireless communication device 102 may include a feedback reporting module 104, coder/decoder A 108, modem A 110, transceiver A 112 and/or one or more antennas 114a-n. Transceiver A 112 may receive one or more signals (e.g., a signal 116) and/or may transmit one or more signals (e.g., a report 118) using the one or more antennas 114a-n. For example, transceiver A 112 may receive, amplify and downconvert a signal 116 from the base station 122, which it may provide to modem A 110. Transceiver A 112 may also obtain a modulated signal provided by modem A 110. Transceiver A 112 may upconvert, amplify and transmit the modulated signal using the one or more antennas 114a-n.

Modem A 110 may modulate and/or demodulate signals. For example, modem A 110 may demodulate a signal provided by transceiver A 112 and provide the demodulated signal to coder/decoder A 108. Modem A 110 may also modulate an encoded signal provided by coder/decoder A 108, which it 110 may provide to transceiver A 112 as a modulated signal.

Coder/decoder A 108 may encode and/or decode signals. For example, coder/decoder A 108 may decode a demodulated signal provided by modem A 110, which it 110 may provide to the feedback reporting module 104. Coder/decoder A 108 may also encode a signal provided by the feedback reporting module 104, which it 108 may provide to modem A 110.

The feedback reporting module 104 may generate feedback (e.g., CQI, PMI, RI and/or ACK/NACK) based on the signal 116 received from the base station 122. For example, the feedback reporting module 104 may measure one or more channel characteristics (e.g., signal-to-noise ratio (SNR), interference, phase shift, timing, frequency drift, directionality, bit error rate, etc.) and generate feedback that is sent as a report 118 to the base station 122. In some configurations, the report 118 may contain CQI, PMI, RI, ACK/NACK and/or channel state information (CSI), etc.

The feedback reporting module 104 may include a reference subframe determination module 106. The reference subframe determination module 106 may determine a reference subframe that is used to generate feedback (e.g., CQI, PMI, RI, etc.). For example, a feedback report 118 may be generated by the wireless communication device 102 that refers to a particular subframe. In other words, the feedback reporting module 104 may determine feedback based on a reference subframe that may be determined based on a reporting subframe. This feedback may be used to improve communications (e.g., reliability, signal strength, etc.) between the wireless communication device 102 and base station 122. The feedback (e.g., CQI, PMI, RI) may also be sent to the base station 122 in subframes. For example, the feedback may be sent to the base station 122 in a subframe described as a "reporting" subframe.

For example, communications between the wireless communication device 102 and the base station 122 may be structured according to radio frames and subframes. Each radio frame may include a number of subframes. Each subframe may be defined according to time (e.g., length of time and/or starting/stopping times). Depending on the configuration, several subframe types may be used, such as uplink subframes, downlink subframes and special subframes, for example.

In some configurations, the reference subframe determination module 106 may determine a reference subframe based on a limit and one or more limiting criteria. For example, the reference subframe determination module 106 may determine a reference subframe based on a limit and one or more limiting criteria such as reporting subframe (number), one or more limits, type of triggering (e.g., periodic or aperiodic), "validity" of a subframe, type of subframe (e.g., type "U" or type "N", uplink subframe, downlink subframe, DCI subframe, etc.), whether a subframe can be used for interference measurement and/or channel measurement, and/or type of reference signal (e.g., common reference signal (CRS) or channel state information reference signal (CSI-RS)). Additionally or alternatively, the reference subframe determination module 106 may determine or select one of a plurality of modes for determining a reference subframe. In some cases, a mode may be selected based on a signal 116 (e.g., instruction, command, etc.) from the base station 122. Examples of some possible configurations regarding determination of one or more reference subframes in accordance with the systems and methods disclosed herein are given in greater detail below.

The base station 122 may include an operations module 130, coder/decoder B 128, modem B 126, transceiver B 124 and/or one or more antennas 120a-n. Transceiver B 124 may receive one or more signals (e.g., a report 118) and/or may transmit one or more signals (e.g., a signal 116) using the one or more antennas 120a-n. For example, transceiver B 124 may receive, amplify and downconvert a signal (e.g., report 118) from the wireless communication device 102, which it may provide to modem B 126. Transceiver B 124 may also obtain a modulated signal provided by modem B 126. Transceiver B 124 may upconvert, amplify and transmit the modulated signal using the one or more antennas 120a-n.

Modem B 126 may modulate and/or demodulate signals. For example, modem B 126 may demodulate a signal provided by transceiver B 124 and provide the demodulated signal to coder/decoder B 128. Modem B 126 may also modulate an encoded signal provided by coder/decoder B 128, which it 126 may provide to transceiver B 124 as a modulated signal.

Coder/decoder B 128 may encode and/or decode signals. For example, coder/decoder B 128 may decode a demodulated signal provided by modem B 126, which it 126 may provide to the operations module 130. Coder/decoder B 128 may also encode a signal provided by the operations module 130, which it 128 may provide to modem B 126.

The operations module 130 may perform one or more functions to enable communications between the base station 122 and the wireless communication device 102. For example, the operations module 130 may generate scheduling messages, reference signals (e.g., CRS, CSI-RS) for feedback generation, a mode selection indicator, etc. One or more of these pieces of information may be transmitted to the wireless communication device 102. For example, the signal 116 may include a reference signal (e.g., CRS, CSI-RS) that the wireless communication device 102 may use to generate a feedback report 118. Additionally or alternatively, the signal 116 may include a mode selection indicator, which the wireless communication device 102 may use to select a mode for determining a reference subframe.

It should be noted that one or more of the elements illustrated as included within the wireless communication device 102 and/or base station 122 may be implemented in hardware, software or a combination of both. For example, the reference subframe determination module 106 may be implemented in hardware, software or a combination of both.

Figure 2:
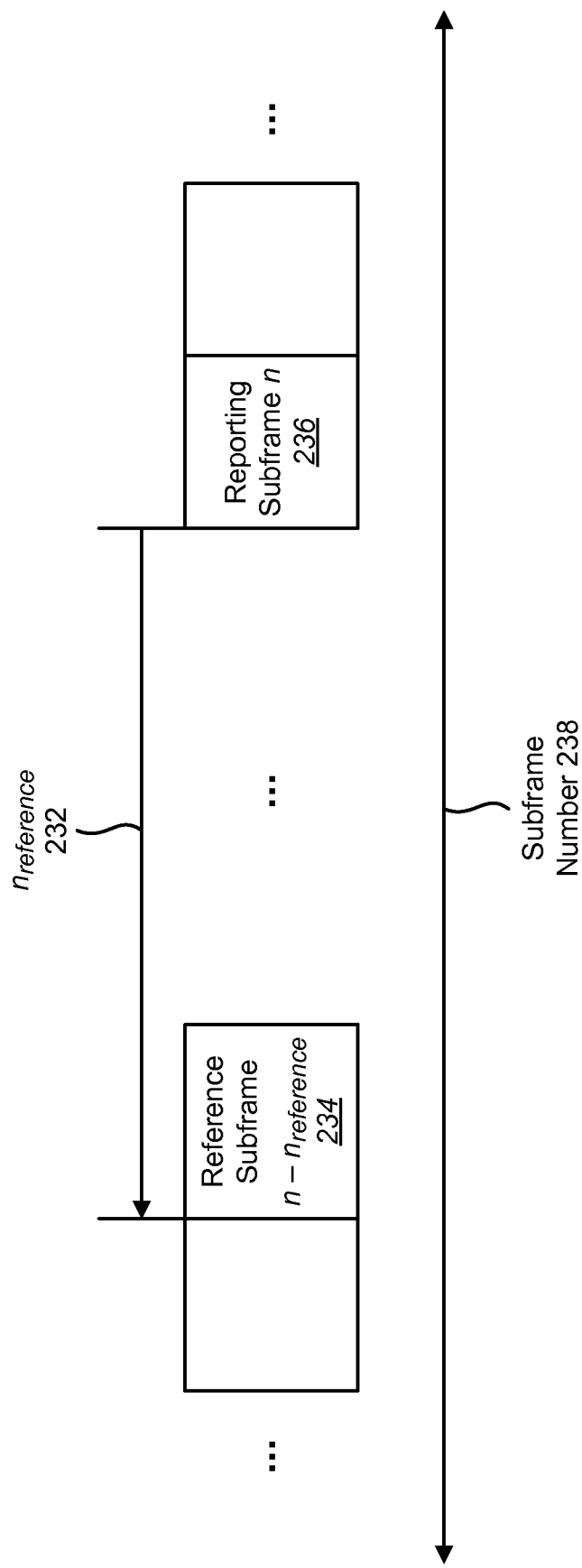
FIG. 2 is a diagram illustrating a series of subframes.

FIG. 2 is a diagram illustrating a series of subframes. As described above, a base station 122 (e.g., eNB) and a wireless communication device 102 (e.g., UE) may send data or information in subframes to each other. Each of these subframes may be designated by a subframe number 238. One or more of these subframes may include information or data. It should be noted that a base station 122 may serve several wireless communication devices 102. In this case, the information in some subframes may correspond to one wireless communication device 102 while the information in other subframes may correspond to another wireless communication device. Additionally or alternatively, the subframes may be of one or more types (e.g., uplink, downlink, special, etc.).

Some subframes may contain control information, such as a downlink control information (DCI) subframe. Some subframe may contain one or more reference signals, such as a common reference signal (CRS) or channel state information reference signal (CSI-RS).

A wireless communication device 102 may determine a reporting subframe n 236. For example, a wireless communication device 102 may be configured to regularly send feedback reports in a designated subframe (according to periodic feedback, for example) or may be configured to send feedback reports when requested by the base station 122 (according to aperiodic triggering, for example). A reporting subframe 236 n may be the subframe in which a feedback report 118 is sent to the base station 122 from the wireless communication device 102. A reporting subframe 236 number may be denoted n.

The wireless communication device 102 may also determine a reference resource subframe $n-n_{reference}$ 234 (which may be referred to as a "reference subframe" herein). The wireless communication device 102 may base a feedback report on a reference subframe 234. For example, the wireless communication device 102 may use the data or information contained in the reference subframe 234 to generate a CQI, PMI and/or RI. A reference resource subframe number may be described as reference subframe $n-n_{reference}$ (e.g., $n-n_{CQI\_ref}$). In other words, the reference resource subframe number $n-n_{reference}$ may be based on and/or described in terms of the reporting subframe number. $n_{reference}$ 232 (e.g., $n_{CQI\_ref}$) may be the difference in subframe number 238 between the reporting subframe n 236 and the reference resource subframe $n-n_{reference}$ 234.

It should be noted that the subframe number 238 may be cyclical or based on a modular function in some configurations. For example, each radio frame may include subframes with subframe numbers 0-9. Thus, if $n_{reference}$ is greater than n, the reference subframe 234 may correspond to a subframe in a previous radio frame. For instance, if n is subframe 2 and $n_{reference}$ is 4, then the reference subframe 234 may be subframe 8 in a previous radio frame.

In some configurations, multiple $n_{reference}$ 232 values may be used, which may specify the same or different reference subframes 234. For example, a first and second n 232 may be used (e.g., $n_{reference}$ and $n_{reference2}$, such as $n_{CQI\_ref\_intf}$ and $n_{CQI\_ref\_channel}$, respectively) to specify the same or different reference subframes 234. The same or different reference subframes may be used to make different types of measurements and/or to generate different types of feedback. For example, $n-n_{CQI\_ref\_intf}$ may specify a first reference subframe used for measuring interference (and generating feedback based on the interference measurement, for example), while $n-n_{CQI\_ref\_channel}$ may specify a second reference subframe (that may be the same as or different from the first reference subframe) used for measuring a channel (and generating feedback based on the channel measurement, for example).

Figure 3:
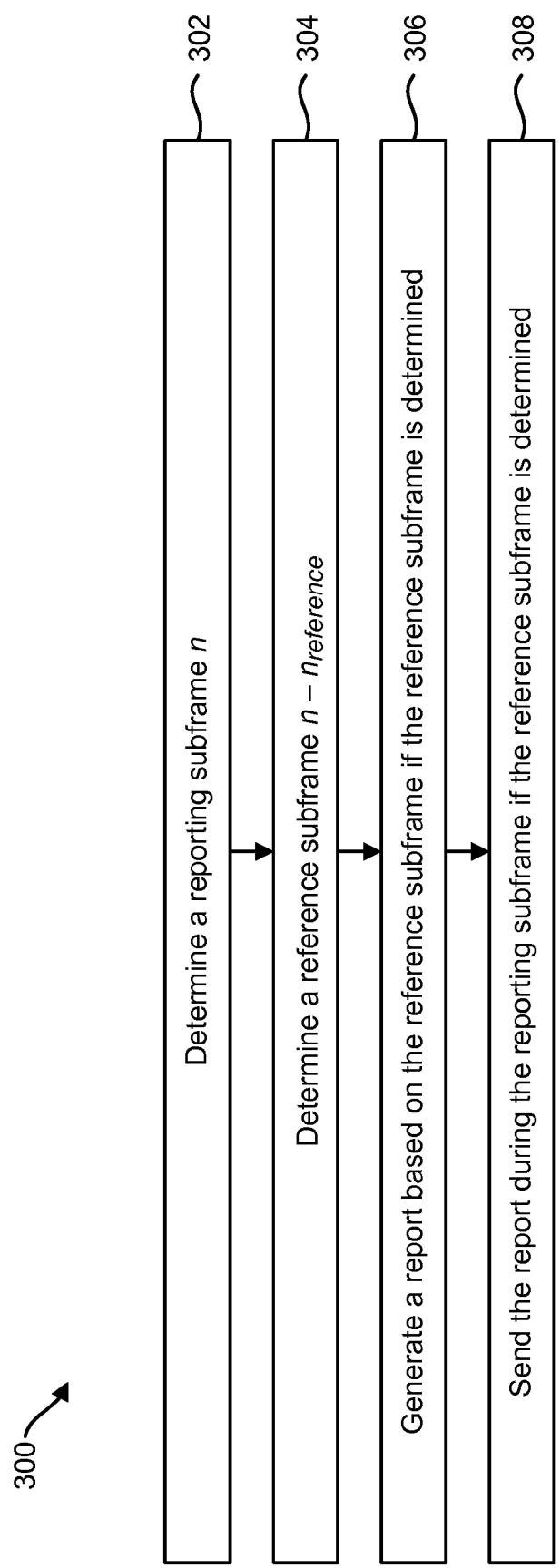
FIG. 3 is a flow diagram illustrating one configuration of a method for determining a reference subframe on a wireless communication device.

FIG. 3 is a flow diagram illustrating one configuration of a method 300 for determining a reference subframe on a wireless communication device 102. The wireless communication device 102 may determine 302 a reporting subframe n. For example, the wireless communication device 102 may be configured to send a feedback report 118 within a designated reporting subframe n based on periodic feedback or aperiodic triggering (e.g., when requested by a base station 122).

The wireless communication device 102 may determine 304 a reference subframe $n-n_{reference}$ if possible. More specifically, the wireless communication device 102 may determine 304 the reference subframe based on a limit (e.g., 4, k, L) and one or more limiting criteria (in addition to the reporting subframe number n, for example) if possible. For example, the limit may limit the range of possible values for $n_{reference}$. In one configuration, for instance, if the limit is 4, then $n_{reference} \geq 4$. The limiting criteria may be one or more additional conditions that may be used by the wireless communication device 102 to determine 304 the reference subframe. For example, the limiting criteria may comprise one or more additional limits (e.g., a maximum value, minimum value or both), whether a subframe is "valid," whether a subframe is a downlink control information (DCI) subframe, whether periodic feedback or aperiodic (feedback) triggering is used, type of reference signal (e.g., CRS or CSI-RS), subframe type, whether the wireless communication device 102 is operating in a heterogeneous network (e.g., HET-NET), whether a subframe is assigned to the wireless communication device 102, whether a subframe falls in a measurement gap and mode. In some cases, a reference subframe may not be determined if there is no subframe available that satisfies the limit and the one or more limiting criteria. It should be noted that a number of subframes may correspond to an amount of time (e.g., delay). Examples of the limit and the one or more limiting criteria are described below in connection with FIGS. 4-12.

The wireless communication device 102 may generate 306 a (feedback) report 118 based on the reference subframe if the reference subframe is determined. For example, the wireless communication device 102 may generate one or more of a CQI, a PMI and/or an RI based on measurements from the reference subframe (e.g., from a common reference signal (CRS) or a channel state information reference signal (CSI-RS)). In some cases, a reference subframe may not be able to be determined. For instance, the limit and the one or more limiting criteria may not be satisfied by any available subframe. In such a case, a report 118 may not be generated.

The wireless communication device 102 may send 308 the report 118 during the reporting subframe if the reference subframe is determined. For example, the wireless communication device 102 may send a CQI, PMI and/or RI feedback report 118 to the base station 122 during the reporting subframe. However, if a reference subframe is not determined, the wireless communication device 102 may not send the report 118.

Figure 4:
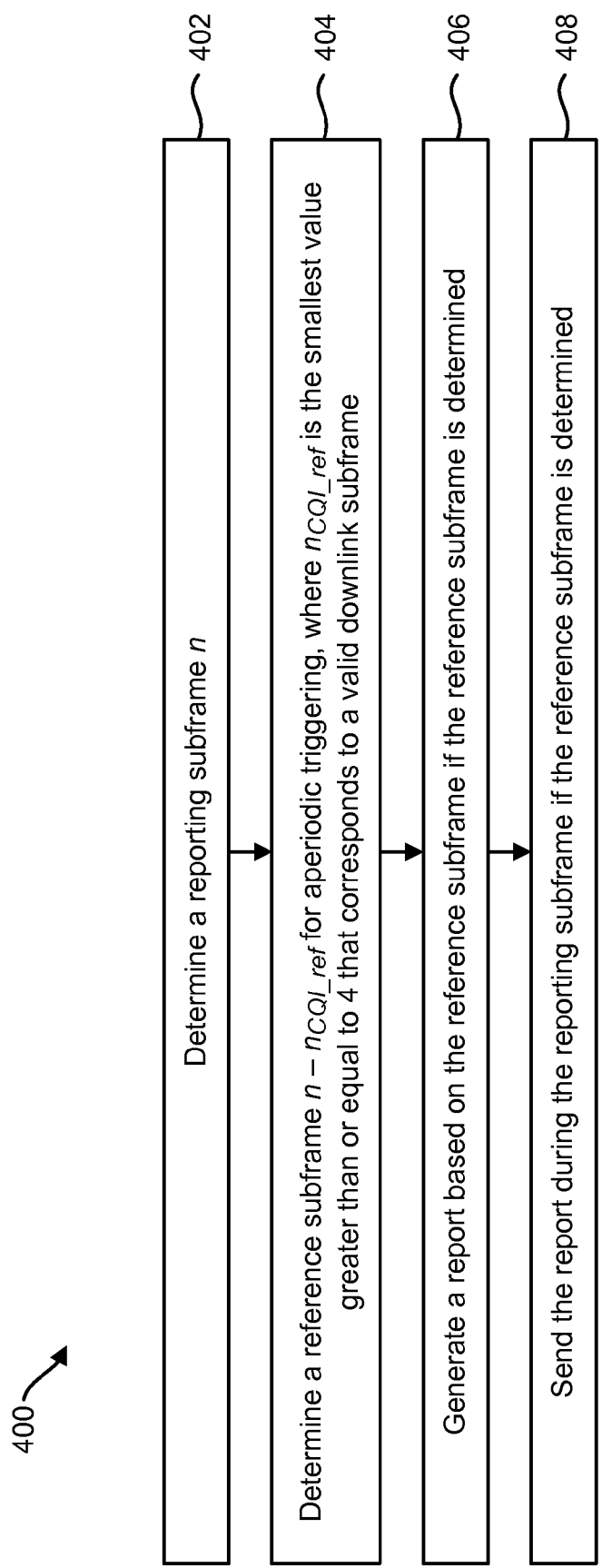
FIG. 4 is a flow diagram illustrating one example of a method for determining a reference subframe.

FIG. 4 is a flow diagram illustrating one example of a method 400 for determining a reference subframe. For instance, FIG. 4 may illustrate one specific mode or example of the method 300 illustrated in FIG. 3. More specifically, FIG. 4 illustrates one example of a method for Common Reference Signal—(CRS) based CQI/PMI/RI reporting. A wireless communication device 102 may determine 402 a reporting subframe n. In other words, the wireless communication device 102 may determine a subframe in which to send a feedback (e.g., CQI/PMI/RI) report 118 as described above. This may be done using aperiodic triggering, for example. In aperiodic triggering, the wireless communication device 102 may receive some timing assignment (from a base station 122, where one bit is a timing assignment, for example) to determine whether a report 118 is triggered or not.

The wireless communication device 102 may determine 404 a reference subframe if possible. The reference subframe for reporting in subframe n may be determined as (e.g., defined by) a single downlink subframe $n-n_{CQI\_ref}$ for aperiodic triggering, where $n_{CQI\_ref}$ is a smallest value greater than or equal to 4, such that it corresponds to a valid downlink subframe. More generally, the wireless communication device 102 may determine 404 a reference subframe based on a limit and at least one limiting criterion if possible. In this example, the limit may be 4 and $n_{reference}$ (e.g. $n_{CQI\_ref}$) is a smallest value greater than or equal to the limit that corresponds to a valid downlink subframe. In this example, the limiting criteria comprise aperiodic triggering. This may be a similar design to that used for periodic CQI. This may also use the same reference timing for Frequency-Division Duplexing (FDD) and Time-Division Duplexing (TDD).

The wireless communication device 102 may generate 406 a (feedback) report 118 based on the reference subframe if the reference subframe is determined. This may be done as described in connection with FIG. 3 above, for example. The wireless communication device 102 may send 408 the report 118 during the reporting subframe if the reference subframe is determined. This may be done as described in connection with FIG. 3 above, for example.

Figure 5:
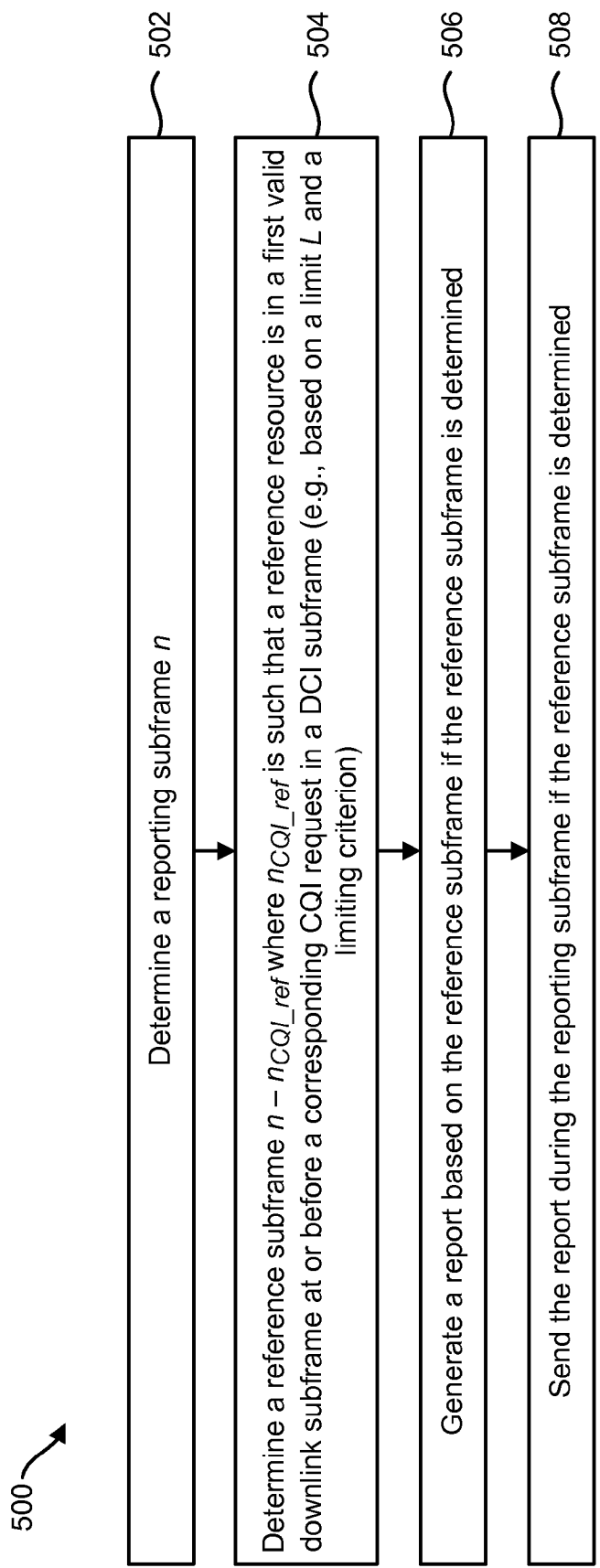
FIG. 5 is a flow diagram illustrating another example of a method for determining a reference subframe.

FIG. 5 is a flow diagram illustrating another example of a method 500 for determining a reference subframe. For instance, FIG. 5 may illustrate one specific mode or example of the method 300 illustrated in FIG. 3. A wireless communication device 102 may determine 502 a reporting subframe n. This may be done based on periodic feedback or aperiodic (feedback) triggering as described above, for example.

The wireless communication device 102 may determine 504 a reference subframe if possible. The reference subframe for reporting in subframe n may be determined as (e.g., defined by) a single downlink subframe $n-n_{CQI\_ref}$, where $n_{CQI\_ref}$ is such that the reference subframe (including a reference resource) is the first valid downlink subframe at or before the corresponding CQI request in a DCI subframe. More generally, the wireless communication device 102 may determine 504 a reference subframe based on a limit (e.g., a value L) and at least one limiting criterion if possible. In this example, the limit may be L and $n_{reference}$ (e.g., $n_{CQI\_ref}$) is a smallest value greater than or equal to the limit that corresponds to a valid downlink subframe. In this example, the limiting criteria comprises limiting L to a difference in subframe number between the reporting subframe n and a downlink control information (DCI) subframe.

This may have potentially different reference timing for FDD and TDD. For FDD, the reference subframe may be the first valid downlink 4 milliseconds (ms) or earlier. The timing between DCI and PUSCH is typically 4 ms. For TDD, the reference subframe may be the first valid downlink X ms or earlier (where X ms corresponds to the limit L, for example). The timing between DCI and PUSCH may be X≥4 ms, for example.

The wireless communication device 102 may generate 506 a (feedback) report 118 based on the reference subframe if the reference subframe is determined. This may be done as described in connection with FIG. 3 above, for example. The wireless communication device 102 may send 508 the report 118 during the reporting subframe if the reference subframe is determined. This may be done as described in connection with FIG. 3 above, for example.

It should be noted that the examples illustrated in FIG. 4 and FIG. 5 may both have the following shortcoming. Upon detection of a DCI with aperiodic CQI triggering, the wireless communication device 102 may have to measure a subframe before the DCI subframe. However, the wireless communication device 102 may be in Discontinuous Reception (DRX) in the subframes before the DCI subframe. Furthermore, the wireless communication device 102 may have to buffer many DL subframes for an aperiodic CQI report. An additional optional limiting criterion that may be applied in the examples illustrated in FIG. 4 and FIG. 5 is to put an additional upper limit on $n_{reference}$ (e.g., $n_{CQI\_ref}$). For example, $4 \leq n_{reference} \leq Y$ or $L \leq n_{reference} \leq Y$, where Y is the upper limit.

Figure 6:
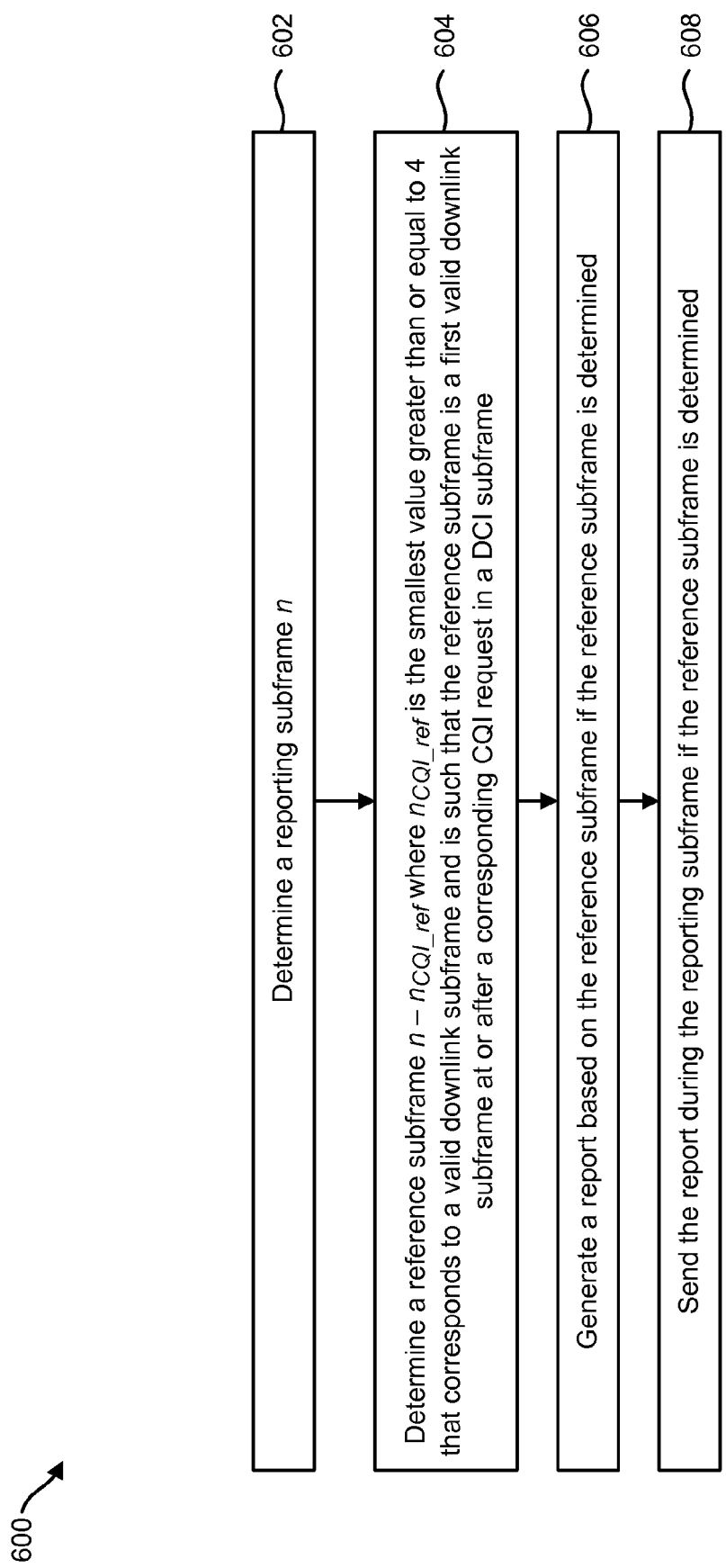
FIG. 6 is a flow diagram illustrating another example of a method for determining a reference subframe.

FIG. 6 is a flow diagram illustrating another example of a method 600 for determining a reference subframe. For instance, FIG. 6 may illustrate one specific mode or example of the method 300 illustrated in FIG. 3. A wireless communication device 102 may determine 602 a reporting subframe n. This may be done based on periodic feedback or aperiodic (feedback) triggering as described above, for example.

The wireless communication device 102 may determine 604 a reference subframe if possible. The reference subframe for reporting in subframe n may be determined as (e.g., defined by) a single downlink subframe $n-n_{CQI\_ref}$, where $n_{CQI\_ref}$ is the smallest value greater than or equal to 4 that corresponds to a valid downlink subframe and is such that the reference subframe (e.g., reference resource) is the first valid downlink subframe at or after the corresponding CQI request in a DCI format. In other words, the reference subframe may be at least 4 ms earlier (than a reporting subframe, for example) and may be at or after a DCI subframe. This may imply that if the DCI subframe is MBSFN and if the timing between DCI and PUSCH is 4 ms (as in FDD and some TDD cases, for example), then aperiodic CQI reporting should not be triggered (or if triggered, then there may be no meaningful aperiodic CQI report). Otherwise (if the timing is >4 ms, as in some TDD cases, for example), aperiodic CQI can be triggered if there is at least one valid downlink reference subframe between the DCI subframe and subframe n–4.

More generally, the wireless communication device 102 may determine 604 a reference subframe based on a limit and at least one limiting criterion if possible. In this example, the limit may be 4 and $n_{reference}$ (e.g. $n_{CQI\_ref}$) is a smallest value greater than or equal to the limit that corresponds to a valid downlink subframe that is at or after a DCI subframe. In this example, the limiting criteria comprises putting an additional upper limit L on $n_{reference}$, where L is a difference in subframe number between the reporting subframe n and a downlink control information (DCI) subframe. For example, $4 \leq n_{reference} \leq L$.

The wireless communication device 102 may generate 606 a (feedback) report 118 based on the reference subframe if the reference subframe is determined. This may be done as described in connection with FIG. 3 above, for example. The wireless communication device 102 may send 608 the report 118 during the reporting subframe if the reference subframe is determined. This may be done as described in connection with FIG. 3 above, for example.

Figure 7:
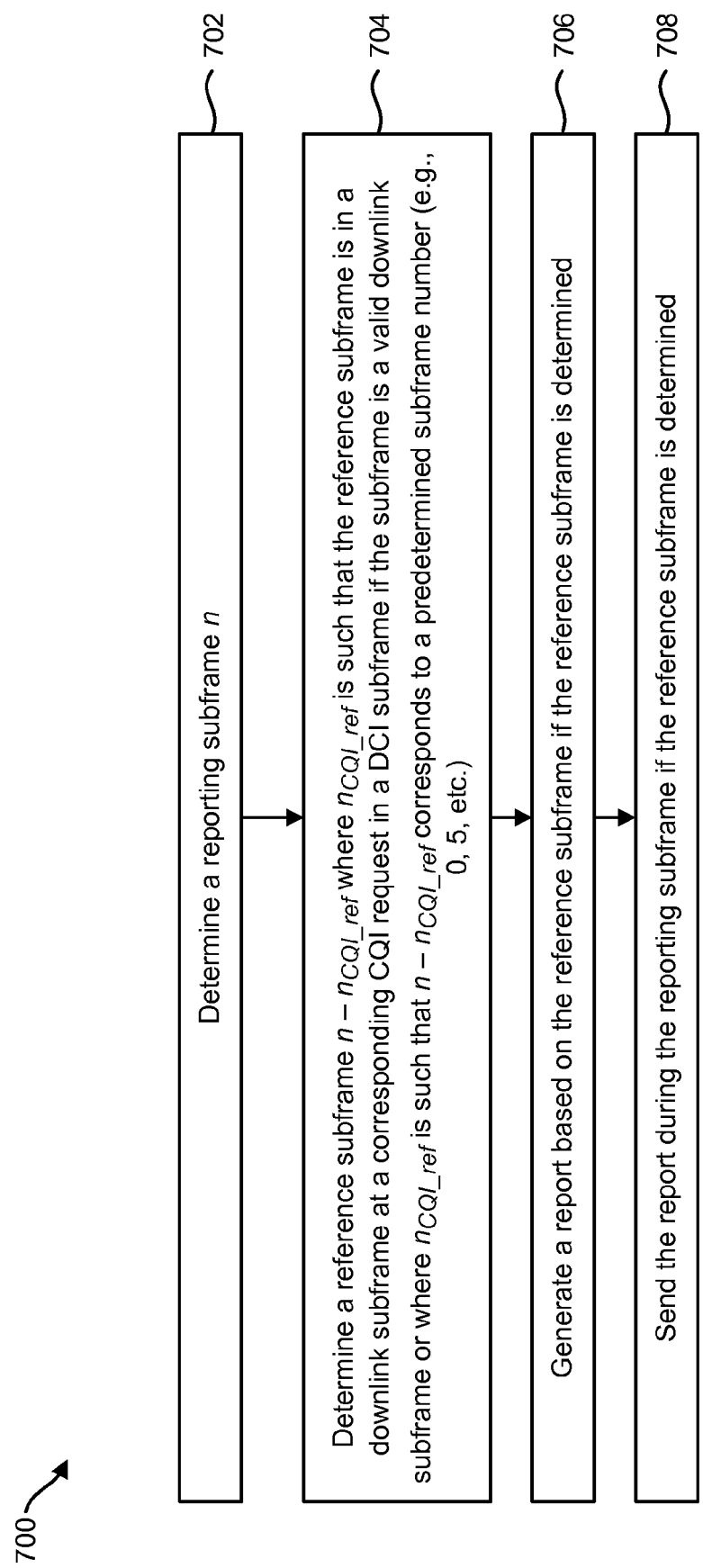
FIG. 7 is a flow diagram illustrating another example of a method for determining a reference subframe.

FIG. 7 is a flow diagram illustrating another example of a method 700 for determining a reference subframe. For instance, FIG. 7 may illustrate one specific mode or example of the method 300 illustrated in FIG. 3. A wireless communication device 102 may determine 702 a reporting subframe n. This may be done based on periodic feedback or aperiodic (feedback) triggering as described above, for example.

The wireless communication device 102 may determine 704 a reference subframe if possible. The reference subframe for reporting in subframe n may be determined as (e.g., defined by) a single downlink subframe $n-n_{CQI\_ref}$, where $n_{CQI\_ref}$ is such that the reference subframe is (e.g., reference resource is in) the downlink subframe at the corresponding CQI request in a DCI subframe if the subframe is a valid downlink subframe or where $n_{CQI\_ref}$ is such that $n-n_{CQI\_ref}$ corresponds to a predetermined (e.g., fixed) subframe number (e.g., 0, 5, etc.).

More generally, the wireless communication device 102 may determine 704 a reference subframe based on a limit and at least one limiting criterion if possible. In this example, the limit may be 4 and $n_{reference}$ (e.g. $n_{CQI\_ref}$) is a smallest value greater than or equal to the limit that corresponds to a valid downlink subframe and the limiting criteria comprises limiting $n_{reference}$ to a value such that $n-n_{reference}$ corresponds to a downlink control information subframe number or corresponds to a predetermined subframe number.

The wireless communication device 102 may generate 706 a (feedback) report 118 based on the reference subframe if the reference subframe is determined. This may be done as described in connection with FIG. 3 above, for example. The wireless communication device 102 may send 708 the report 118 during the reporting subframe if the reference subframe is determined. This may be done as described in connection with FIG. 3 above, for example.

Figure 8:
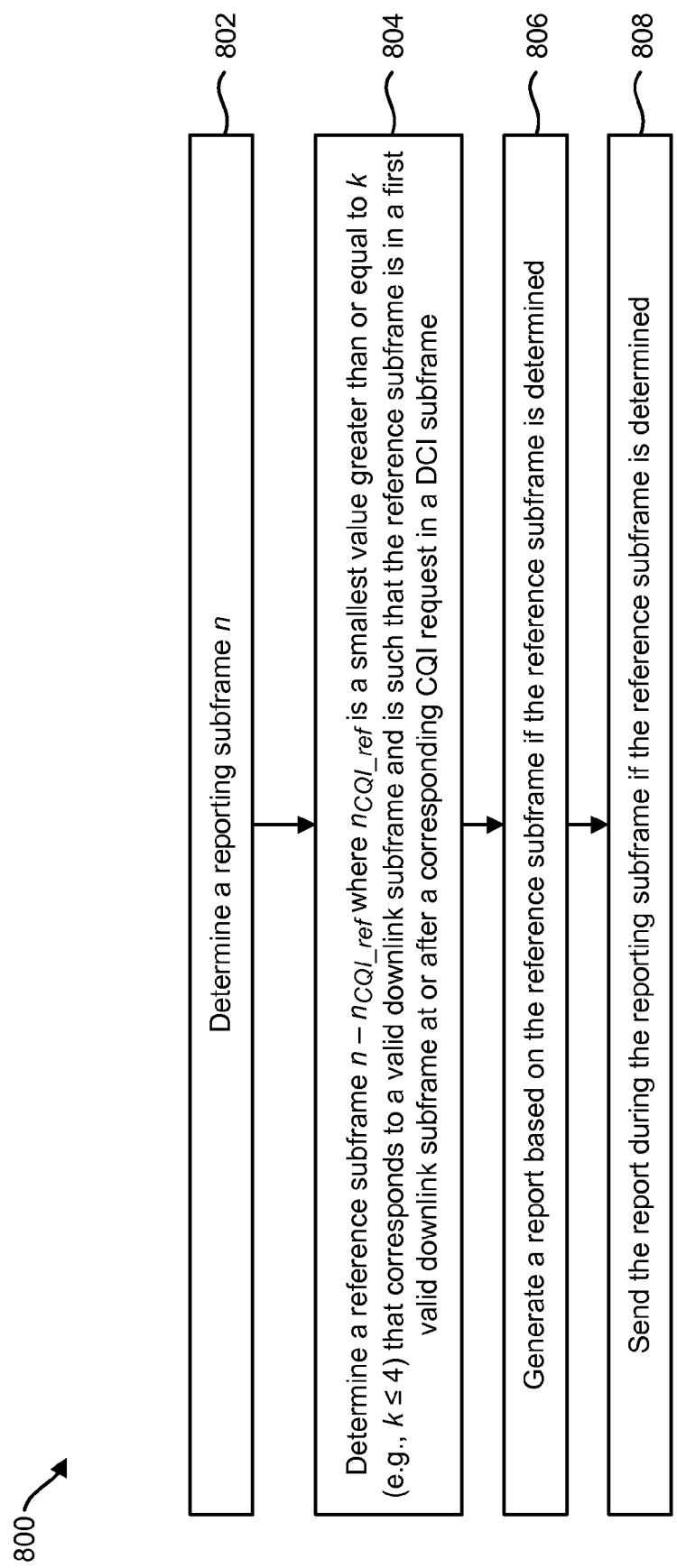
FIG. 8 is a flow diagram illustrating another example of a method for determining a reference subframe.

FIG. 8 is a flow diagram illustrating another example of a method 800 for determining a reference subframe. For instance, FIG. 8 may illustrate one specific mode or example of the method 300 illustrated in FIG. 3. This example may be considered an extension of the example illustrated in FIG. 6. A wireless communication device 102 may determine 802 a reporting subframe n. This may be done based on periodic feedback or aperiodic (feedback) triggering as described above, for example.

The wireless communication device 102 may determine 804 a reference subframe if possible. The reference subframe for reporting in subframe n may be determined as (e.g., defined by) a single downlink subframe $n-n_{CQI\_ref}$, where $n_{CQI\_ref}$ is the smallest value greater than or equal to k (where $2 \leq k \leq 4$, for example) that corresponds to a valid downlink subframe and is such that the reference subframe is (e.g., the reference resource is in) the first valid downlink subframe at or after a corresponding CQI request in a DCI subframe. For example, this allows relaxed timing between the reference subframe and CQI reporting. Instead of a minimum of 4 ms, for instance, a smaller value may be used.

More generally, the wireless communication device 102 may determine 804 a reference subframe based on a limit and at least one limiting criterion if possible. In this example, the limit may be k and $n_{reference}$ (e.g. $n_{CQI\_ref}$) is a smallest value greater than or equal to the limit that corresponds to a valid downlink subframe that is at or after a DCI subframe. In this example, the limiting criteria comprises putting an additional upper limit L on $n_{reference}$, where L is a difference in subframe number between the reporting subframe n and a downlink control information (DCI) subframe. For example, $k \leq n_{reference} \leq L$.

The wireless communication device 102 may generate 806 a (feedback) report 118 based on the reference subframe if the reference subframe is determined. This may be done as described in connection with FIG. 3 above, for example. The wireless communication device 102 may send 808 the report 118 during the reporting subframe if the reference subframe is determined. This may be done as described in connection with FIG. 3 above, for example.

The examples illustrated in FIGS. 4 through 8 may be summarized as illustrated in Table (1).

TABLE (1)

| Example illustrated in: | $n_{CQI\_ref}$ | Notes |
|---|---|---|
| FIG. 4 | First valid DL subframe ≥ 4 | May also be within a certain limit |
| FIG. 5 | First valid DL subframe ≥ L | L is the difference between the CQI reporting subframe and the DCI subframe; may also be within a certain limit |
| FIG. 6 | First valid DL subframe ≥ 4, but $n_{CQI\_ref} \leq L$ | |
| FIG. 7 | First valid DL subframe ≥ 4, and reference subframe corresponds to a fixed subframe number (e.g., 0, 5, etc.) | |
| FIG. 8 | First valid DL subframe ≥ k, but $n_{CQI\_ref} \leq L$ (k ≤ 4, for example) | A minimum k may be enforced, e.g., k ≥ 2 |

Figure 9:
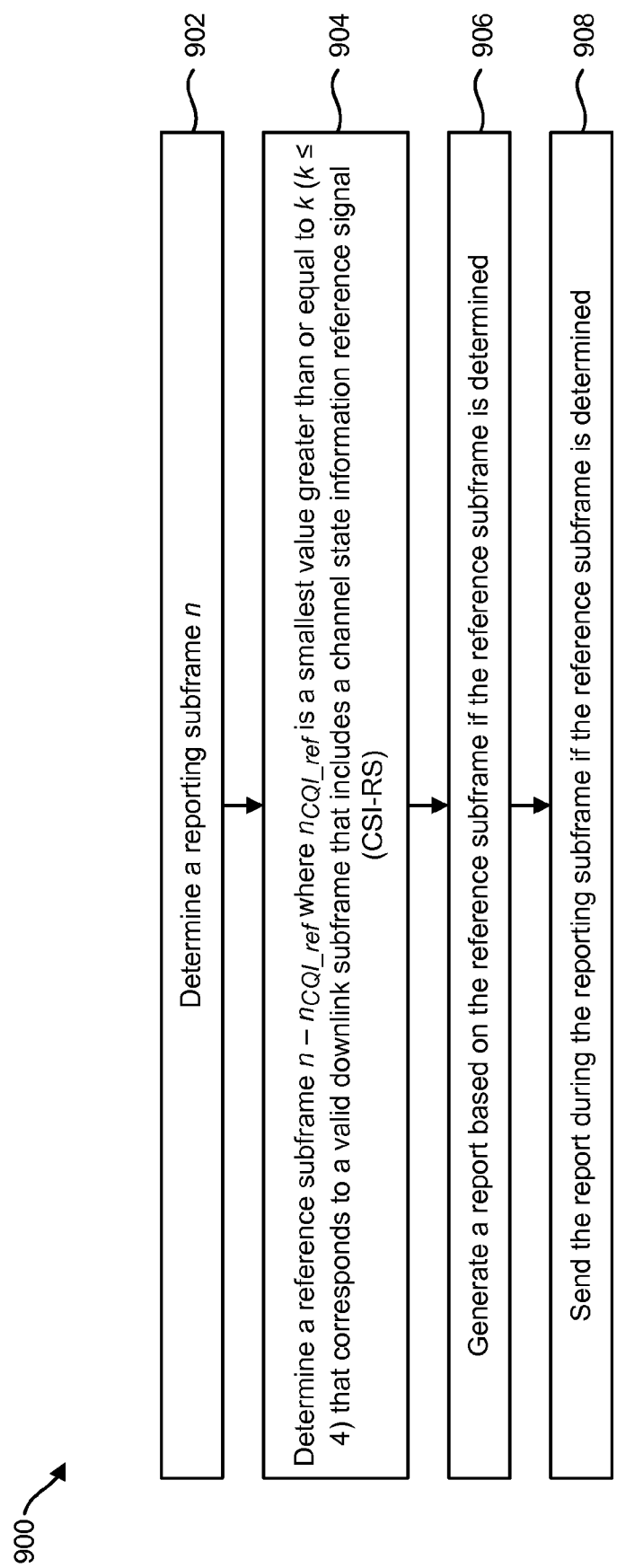
FIG. 9 is a flow diagram illustrating another example of a method for determining a reference subframe.

FIG. 9 is a flow diagram illustrating another example of a method 900 for determining a reference subframe. For instance, FIG. 9 may illustrate one specific mode or example of the method 300 illustrated in FIG. 3. In this example, a single reference subframe may be used for both channel and interference determination. A wireless communication device 102 may determine 902 a reporting subframe n. This may be done based on periodic feedback or aperiodic (feedback) triggering as described above, for example.

The wireless communication device 102 may determine 904 a reference subframe if possible. The reference subframe for reporting in subframe n may be determined as (e.g., defined by) a single downlink subframe $n-n_{CQI\_ref}$, where $n_{CQI\_ref}$ is a smallest value greater than or equal to k that corresponds to a valid downlink subframe that includes a channel state information reference signal (CSI-RS). For example, a downlink subframe may be considered valid if it includes a CSI-RS.

In one example, both channel (for PMI feedback, for example) and interference (for CQI feedback, for example) may be measured via a channel state information reference signal (CSI-RS). A reference subframe may be a most recent subframe including a CSI-RS. The reference subframe may be defined valid if it is a downlink subframe, is not in a measurement gap and contains a CSI-RS.

More generally, the wireless communication device 102 may determine 904 a reference subframe based on a limit and at least one limiting criterion if possible. In this example, the limit may be k and $n_{reference}$ (e.g. $n_{CQI\_ref}$) is a smallest value greater than or equal to the limit that corresponds to a valid downlink subframe. In this example, the limiting criteria comprise a downlink subframe that includes a CSI-RS.

The wireless communication device 102 may generate 906 a (feedback) report 118 based on the reference subframe if the reference subframe is determined. This may be done as described in connection with FIG. 3 above, for example. The wireless communication device 102 may send 908 the report 118 during the reporting subframe if the reference subframe is determined. This may be done as described in connection with FIG. 3 above, for example.

Figure 10:
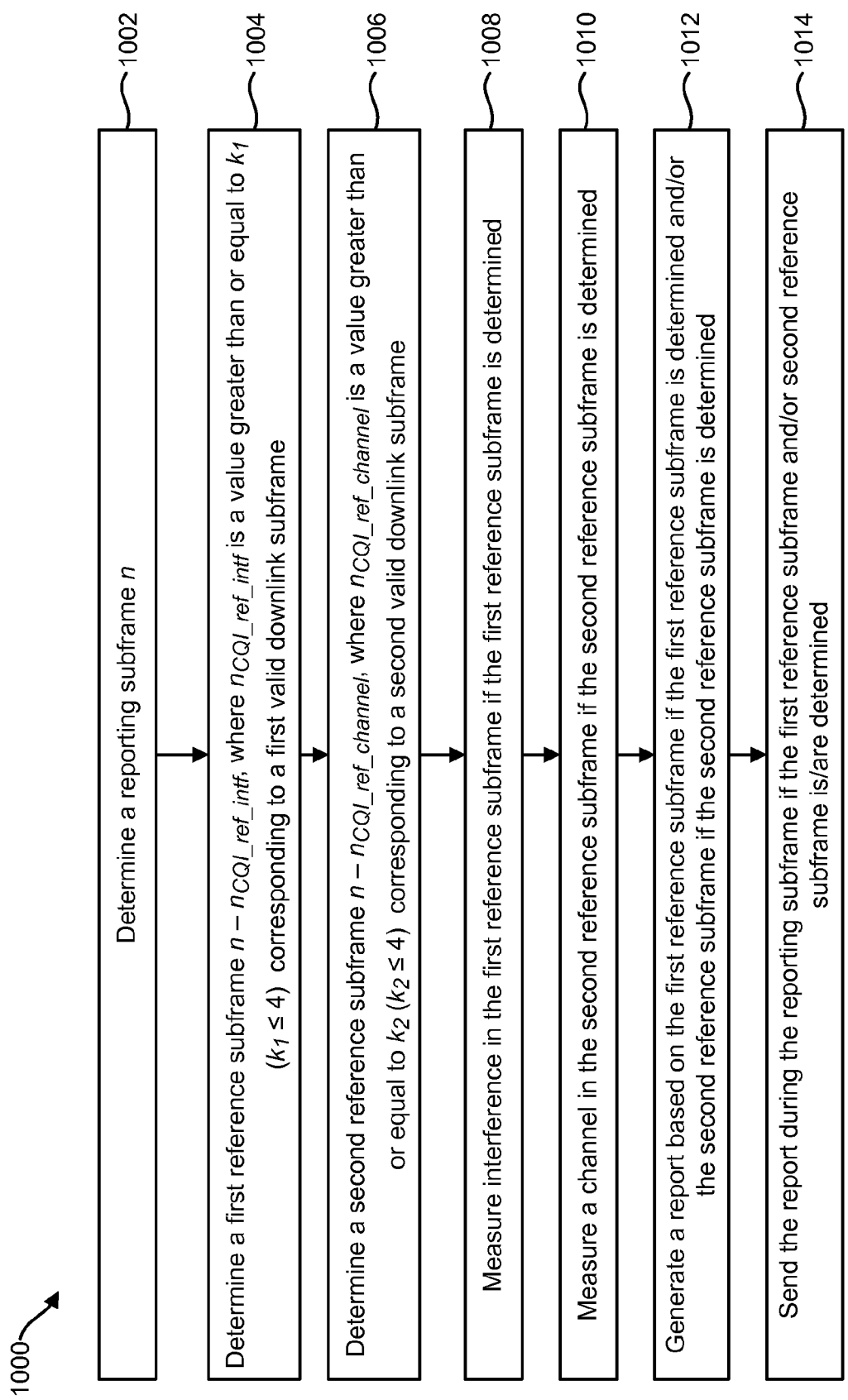
FIG. 10 is a flow diagram illustrating another example of a method for determining a reference subframe.

FIG. 10 is a flow diagram illustrating another example of a method 1000 for determining a reference subframe. For instance, FIG. 10 may illustrate one specific mode or example of the method 300 illustrated in FIG. 3. In this example, the same or different reference subframes may be used for channel and interference determination. A wireless communication device 102 may determine 1002 a reporting subframe n. This may be done based on periodic feedback or aperiodic (feedback) triggering as described above, for example.

The wireless communication device 102 may determine 1004 a first reference subframe $n-n_{reference}$ (e.g., $n-n_{CQI\_ref\_intf}$) if possible. The first reference subframe for reporting in subframe n may be determined as (e.g., defined by) a single downlink subframe $n-n_{CQI\_ref\_intf}$, where $n_{CQI\_ref\_intf}$ is a value greater than or equal to $k_1$ (e.g., $k_1 \leq 4$), such that it corresponds to a first valid downlink subframe.

More generally, the wireless communication device 102 may determine 1004 a first reference subframe based on a limit and at least one limiting criterion if possible. In this example, the limit may be $k_1$ and $n_{reference}$ (e.g. $n_{CQI\_ref\_intf}$) is a value greater than or equal to the limit that corresponds to a first valid downlink subframe. Furthermore, the limiting criteria comprise using the subframe for interference measurement. For instance, $n-n_{reference}$ may specify a downlink subframe that can be used to measure interference (for CQI feedback, for example).

The wireless communication device 102 may determine 1006 a second reference subframe $n-n_{reference2}$ (e.g., $n-n_{CQI\_ref\_channel}$) if possible. The second reference subframe for reporting in subframe n may be determined as (e.g., defined by) a single downlink subframe $n-n_{CQI\_ref\_channel}$, where $n_{CQI\_ref\_channel}$ is a value greater than or equal to $k_2$ (e.g., $k_2 \leq 4$), such that it corresponds to a second valid downlink subframe.

More generally, the wireless communication device 102 may determine 1006 a second reference subframe based on a limit (and optionally based on at least one limiting criterion, for instance) if possible. In this example, a second limit may be $k_2$ and $n_{reference2}$ (e.g., $n_{CQI\_ref\_channel}$) is a value greater than or equal to the second limit that corresponds to a second valid downlink subframe (which may be the same as or different from the first valid downlink subframe). In some configurations, the limiting criteria may further comprise using the second valid downlink subframe for channel measurement. For instance, $n-n_{reference2}$ (e.g., $n-n_{CQI\_ref\_channel}$) may specify a downlink subframe that can be used to measure a channel (for PMI feedback, for example).

The wireless communication device 102 may measure 1008 interference in the first reference subframe if the first reference subframe is determined (e.g., if a subframe is available that satisfies the conditions described above). For example, the wireless communication device 102 may measure 1008 interference using a signal (e.g., data or information received and/or not received) in the first reference subframe. The wireless communication device 102 may measure 1010 a channel in the second reference subframe if the second reference subframe is determined (e.g., if a subframe is available that satisfies the conditions described above). For example, the wireless communication device 102 may measure 1010 a channel using a signal (e.g., data or information received and/or not received) in the second reference subframe.

In one example, a channel may be measured via CSI-RS and interference may be measured via CRS. For instance, a first reference subframe may be defined based on CRS. More specifically, one of the $n_{reference}$ values described earlier (in connection with FIG. 4, FIG. 5, FIG. 6, FIG. 7, FIG. 8 or that described in connection with Release-8 options above, for example) may be applied. A reference subframe may be valid if it is a downlink subframe, not in a measurement gap, possibly not DwPTS and/or not MBSFN. A second reference subframe may be based on CSI-RS, where it corresponds to a most recent CSI-RS subframe and does not fall in a measurement gap.

In another example, a channel may be measured via CSI-RS, while interference may be measured via CRS. In another example, both the channel and interference may be measured via CRS. In yet another example, both the channel and interference may be measured via CSI-RS.

The wireless communication device 102 may generate 1012 a (feedback) report 118 based on the first reference subframe if the first reference subframe is determined and/or based on the second reference subframe if the second reference subframe is determined. For example, the wireless communication device 102 may generate one or more of a CQI, a PMI and/or an RI based on the information received (or not received) in the reference subframe(s). The wireless communication device 102 may then send 1014 the report during the reporting subframe if the first reference subframe is determined and/or if the second reference subframe is determined. More specifically, the wireless communication device 102 may send a CQI, PMI and/or RI feedback report to the base station 122 during the reporting subframe if possible.

Figure 11:
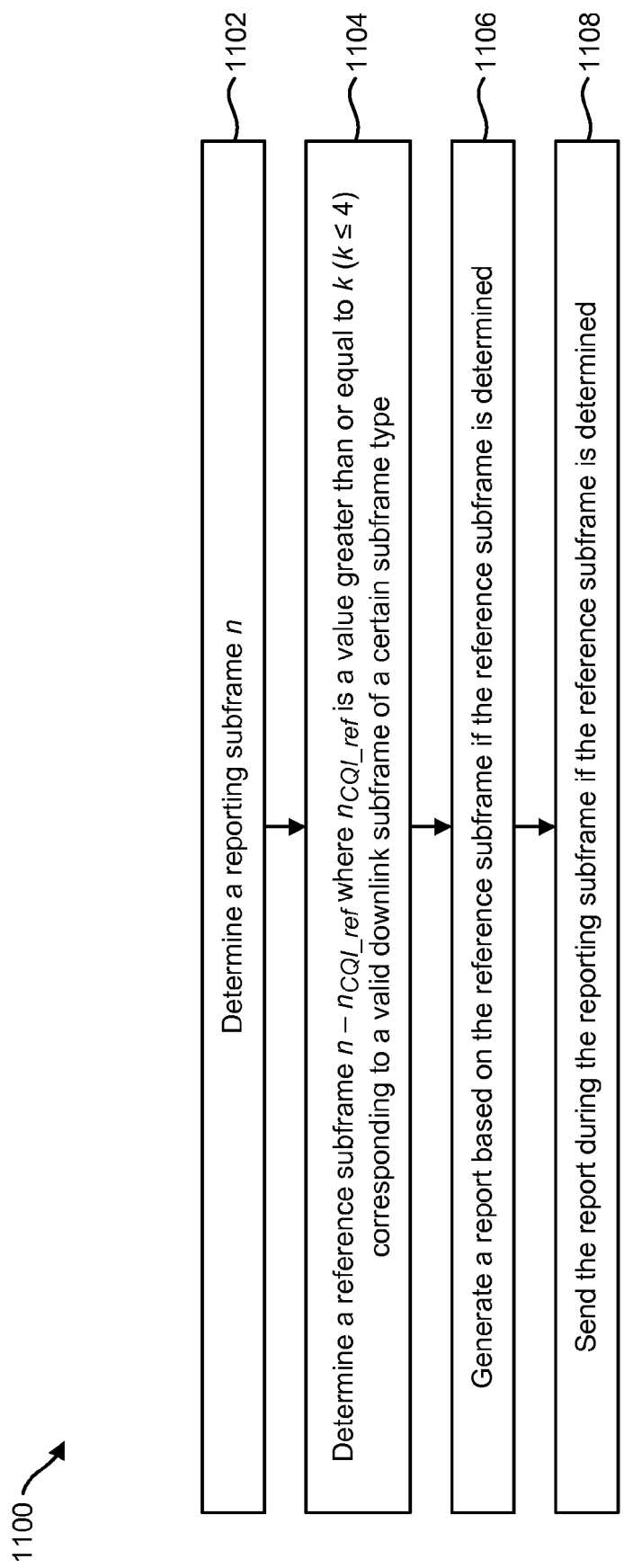
FIG. 11 is a flow diagram illustrating another example of a method for determining a reference subframe.

FIG. 11 is a flow diagram illustrating another example of a method 1100 for determining a reference subframe. For instance, FIG. 10 may illustrate one specific mode or example of the method 300 illustrated in FIG. 3. The method illustrated in FIG. 11 may use the same or different subframe types. For example, a reference subframe may be determined based on subframe type. For instance, In Heterogeneous Networks (HetNets), there may be different subframe types. Each type may represent a certain amount of inter-cell interference on average from the wireless communication device 102 perspective. For example, an N type subframe may be a subframe that has a high amount of interference for a particular wireless communication device 102. For instance, an N type subframe may include higher than average interference for a subframe. In some cases, an N type subframe may be generally deemed unusable (though it still may be used in some cases). A U type subframe may be a subframe that has less interference. For instance, a U type subframe may include lower than average interference for a subframe. In some cases, a U type subframe may be deemed usable. A PDCCH may be selectively transmitted in certain subframes (and/or subframe types). Cross-subframe scheduling may also be used. For example, the timing between a PDCCH and PUSCH may no longer be Release-8 based, but may be different from (e.g., larger than) that in Release-8.

In the example illustrated in FIG. 11, a same reference subframe may be used for both channel and interference determinations. Furthermore, this method may be applicable to both CRS and CSI-RS configurations. A wireless communication device 102 may determine 1102 a reporting subframe n. In other words, the wireless communication device 102 may determine 1102 a subframe in which to send a feedback (e.g., CQI/PMI/RI) report 118 based on periodic feedback or aperiodic (feedback) triggering as described above.

The wireless communication device 102 may determine 1104 a reference subframe $n-n_{reference}$ (e.g., $n-n_{CQI\_ref}$) if possible. The reference subframe for reporting in subframe n may be determined as (e.g., defined by) a single downlink subframe $n-n_{CQI\_ref}$, where $n_{CQI\_ref}$ is a value greater than or equal to k (e.g., k≤4), such that it corresponds to a valid downlink subframe of a certain subframe type.

For example, one of the examples (e.g., $n_{reference}$ values) described earlier in connection with FIG. 4, FIG. 5, FIG. 6, FIG. 7, FIG. 8, FIG. 9, FIG. 10 or Release-8 may be applied subject to a certain subframe type. It should also be noted that the subframe type of the reference subframe and the reporting subframe may be the same or different, which may be controlled by a base station 122 (e.g., eNB). In other words, the subframe type for a reference subframe may be implicitly or explicitly defined.

More generally, the wireless communication device 102 may determine 1104 a reference subframe based on a limit and at least one limiting criterion if possible. In this example, the limit may be k and $n_{reference}$ (e.g., $n_{CQI\_ref}$) is a smallest value greater than or equal to the limit that corresponds to a valid downlink subframe. In this example, the limiting criteria comprise a downlink subframe that is a certain subframe type (e.g., "N" or "U").

The wireless communication device 102 may generate 1106 a (feedback) report 118 based on the reference subframe if the reference subframe is determined. This may be done as described in connection with FIG. 3 above, for example. The wireless communication device 102 may send 1108 the report 118 during the reporting subframe if the reference subframe is determined. This may be done as described in connection with FIG. 3 above, for example.

Figure 12:
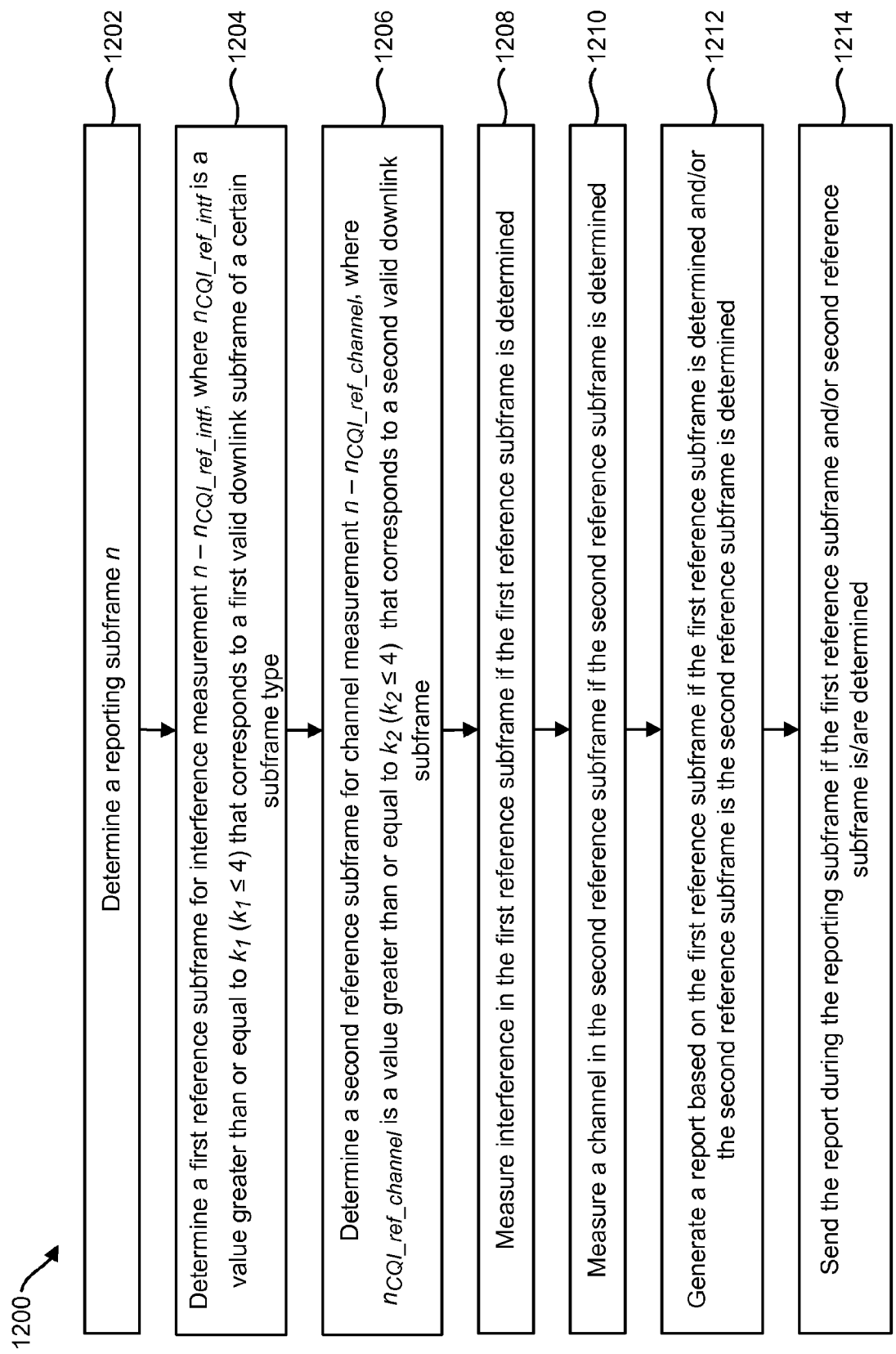
FIG. 12 is a flow diagram illustrating another example of a method for determining a reference subframe.

FIG. 12 is a flow diagram illustrating another example of a method 1200 for determining a reference subframe. For instance, FIG. 12 may illustrate one specific mode or example of the method 300 illustrated in FIG. 3. The example illustrated in FIG. 12 may use the same or different subframe types. For example, a reference subframe may be determined based on subframe type (e.g., "U" or "N" as described above). Each type may represent a certain amount inter-cell interference on average from the wireless communication device 102 perspective. A PDCCH may be selectively transmitted in certain subframes (and/or subframe types). Cross-subframe scheduling may also be used. For example, the timing between a PDCCH and PUSCH may no longer be Release-8 based, but may be different from (e.g., larger than) that in Rel-8.

In the example illustrated in FIG. 12, different reference subframes may be used for channel and interference determinations in some cases. Furthermore, this example may be applicable to both CRS and CSI-RS configurations. A wireless communication device 102 may determine 1202 a reporting subframe n. In other words, the wireless communication device 102 may determine 1202 a subframe in which to send a feedback (e.g., CQI/PMI/RI) report 118 as described above.

The wireless communication device 102 may determine 1204 a first reference subframe $n-n_{reference}$ (e.g., $n-n_{CQI\_ref\_intf}$) if possible. The first reference subframe for reporting in subframe n may be determined as (e.g., defined by) a single downlink subframe $n-n_{CQI\_ref\_intf}$, where $n_{CQI\_ref\_intf}$ is a value greater than or equal to $k_1$ (e.g., $k_1 \leq 4$), such that it corresponds to a first valid downlink subframe of a certain subframe type.

More generally, the wireless communication device 102 may determine 1204 a first reference subframe based on a limit and at least one limiting criterion if possible. In this example, the limit may be $k_1$ and $n_{reference}$ (e.g., $n_{CQI\_ref\_intf}$) is a value greater than or equal to the limit that corresponds to a first valid downlink subframe. Furthermore, the limiting criteria comprise using a subframe of a certain subframe type (e.g., "U" or "N"). For instance, $n-n_{reference}$ may specify a downlink subframe of a certain type that can be used to measure interference (for CQI feedback, for example).

The wireless communication device 102 may determine 1206 a second reference subframe $n-n_{reference2}$ (e.g., $n-n_{CQI\_ref\_channel}$) if possible. The second reference subframe for reporting in subframe n may be determined as (e.g., defined by) a single downlink subframe $n-n_{CQI\_ref\_channel}$, where $n_{CQI\_ref\_channel}$ is a value greater than or equal to $k_2$ (e.g., $k_2 \leq 4$), such that it corresponds to a second valid downlink subframe (of a certain subframe type, for example).

More generally, the wireless communication device 102 may determine 1206 a second reference subframe based on a limit (and optionally based on at least one limiting criterion, for instance) if possible. In this example, a second limit may be $k_2$ and $n_{reference2}$ (e.g., $n_{CQI\_ref\_channel}$) is a value greater than or equal to the second limit that corresponds to a second valid downlink subframe (which may be the same as or different from the first valid downlink subframe). In some configurations, the limiting criteria may further comprise using the second valid downlink subframe of a certain subframe type. For instance, $n-n_{reference2}$ (e.g., $n-n_{CQI\_ref\_channel}$) may specify a downlink subframe of a certain subframe type that can be used to measure a channel (for PMI feedback, for example).

The wireless communication device 102 may measure 1208 interference in the first reference subframe if the first reference subframe is determined (e.g., if a subframe is available that satisfies the conditions described above). For example, the wireless communication device 102 may measure 1208 interference using a signal (e.g., data or information received and/or not received) in the first reference subframe. The wireless communication device 102 may measure 1210 a channel in the second reference subframe if the second reference subframe is determined (e.g., if a subframe is available that satisfies the conditions described above). For example, the wireless communication device 102 may measure 1210 a channel using a signal (e.g., data or information received and/or not received) in the second reference subframe.

The wireless communication device 102 may generate 1212 a (feedback) report 118 based on the first reference subframe if the first reference subframe is determined and/or based on the second reference subframe if the second reference subframe is determined. For example, the wireless communication device 102 may generate one or more of a CQI, a PMI and/or an RI based on the information received (or not received) in the reference subframe(s). The wireless communication device 102 may then send 1214 the report during the reporting subframe if the first reference subframe is determined and/or if the second reference subframe is determined. More specifically, the wireless communication device 102 may send a CQI, PMI and/or RI feedback report to the base station 122 during the reporting subframe if possible.

Thus, several alternative reference subframes for CQI/CSI reporting at subframe n may be used. In one example, the reference subframe may be (always) based on the DCI subframe, if the subframe is valid. Measurement delay may be larger than 4 ms, though this may not be desirable. In another example, the reference subframe may be based on a valid subframe (e.g., n-k, where k≥2, k≥4, etc.) or earlier, but not before the DCI subframe. Measurement delay may be well controlled. In another example, the reference subframe may be based on a valid subframe (e.g., n-k where k≥2, k≥4, etc.) or earlier of the same subframe type as the DCI subframe, but not before the DCI subframe. In this example, measurement delay may be well controlled. A wireless communication device 102 may be semi-statically configured for either option. Other variations discussed above may be applicable as well.

Several points should be noted. Interference may always be measured in the defined reference subframe. In one example, a reference subframe type (e.g. type U/type N) may be controlled with DCI timing. In another example, the reference subframe type may be controlled with a Layer 3 (L3) CSI configuration. In yet another example, the reference subframe type may be controlled with DCI codepoints. A valid subframe for interference may be the most recent subframe of the requested type satisfying one of the alternate conditions described above. The channel may be measured in the most recent suitable subframe. A suitable subframe could be a U subframe (for the serving cell, for example). In mild interference conditions, any subframe may be suitable for the channel measurement. For example, strict definition of subframes may not be necessary, unless CRS or CSI-RS power variations are allowed.

It should also be noted that a wireless communication device 102 may be configured to use one or several of the examples described above. For example, a wireless communication device 102 may be configured such that it may determine the reference subframe using one or more of the examples (e.g., "modes") illustrated in FIGS. 4-12. For example, a wireless communication device 102 may determine that one of the methods would be more beneficial (e.g., depending on channel conditions) and may thus select and use that method. Additionally or alternatively, a base station 122 may assign a wireless communication device 102 to select one of several available modes for determining a reference subframe.

Additionally, for a wireless communication device 102, different design options may be applied for different channel feedback types. For instance, for an RI (which is typically sent less frequently), a wireless communication device 102 may not follow the same specific subframe type (e.g., "U" or "N" type subframes) as for CQI and/or PMI. RI may be reported by always referring to the U subframes in some configurations. In this case, PMI and CQI for the N subframes may be unified and independent from the RI reported for the U subframes. In other words, the base station 122 (e.g., eNB) may interpret the rank in the N subframes different from the U subframes. Alternatively, RI may be reported individually for two or more subframe types (e.g., one for U subframes and the other for "N" subframes).

Figure 13:
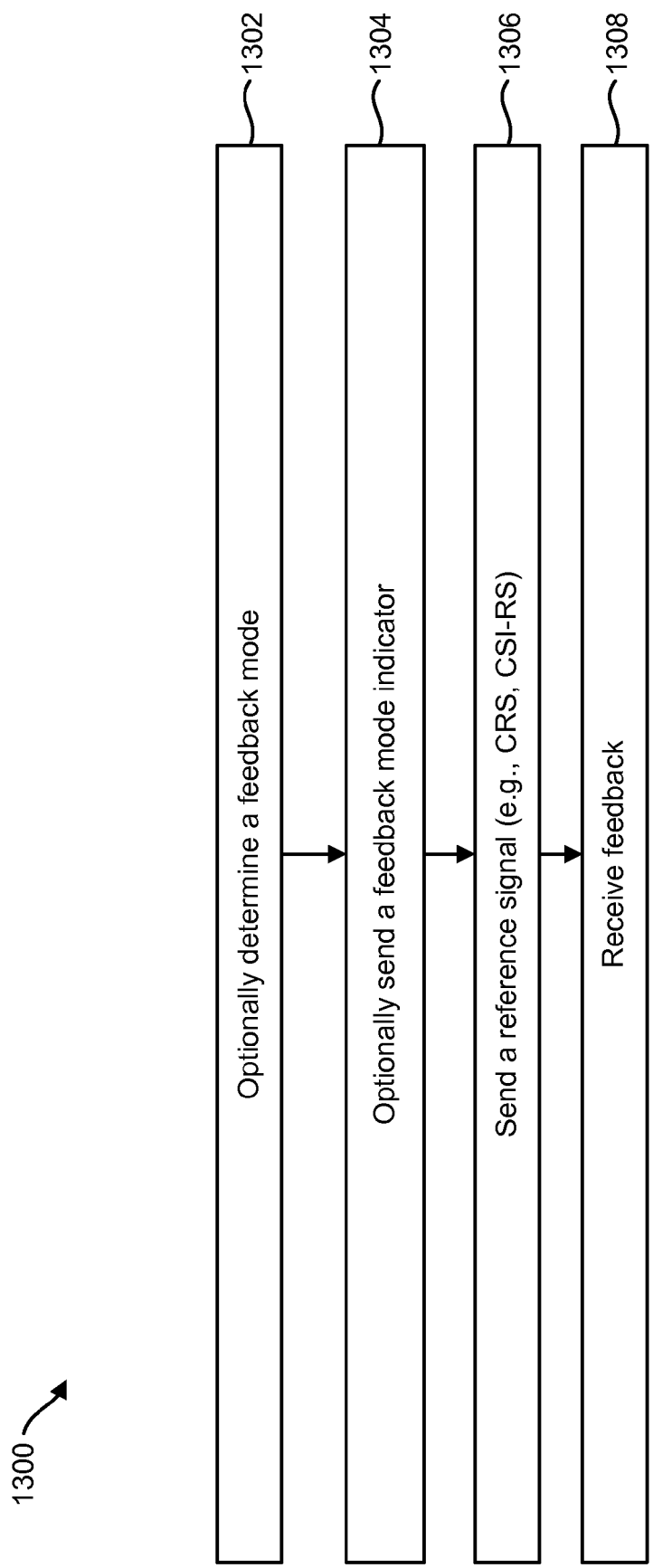
FIG. 13 is a flow diagram illustrating one configuration of a method for determining a mode on a base station.

FIG. 13 is a flow diagram illustrating one configuration of a method 1300 for determining a mode on a base station 122. More specifically, FIG. 13 illustrates one method 1300 for optionally determining a reference subframe determination mode. A base station 122 may optionally determine 1302 a reference subframe determination mode. For example, the base station 122 may determine a mode that a wireless communication device 102 may use to determine a reference subframe. For instance, the base station 122 may select one of the modes (e.g., examples) described above. The base station 122 may then optionally send 1304 a feedback mode indicator. For example, the base station 122 may send an indicator to the wireless communication device 102 that specifies a particular reference subframe determination mode to use.

The base station 122 may send 1306 a reference signal. For example, the base station 122 may send one or more reference signals such as a common reference signal (CRS) and/or a channel state information reference signal (CSI-RS). The base station 122 may receive 1308 feedback (e.g., a feedback report 118). For example, the base station 122 may receive CQI, PMI and/or RI from the wireless communication device 102.

Figure 14:
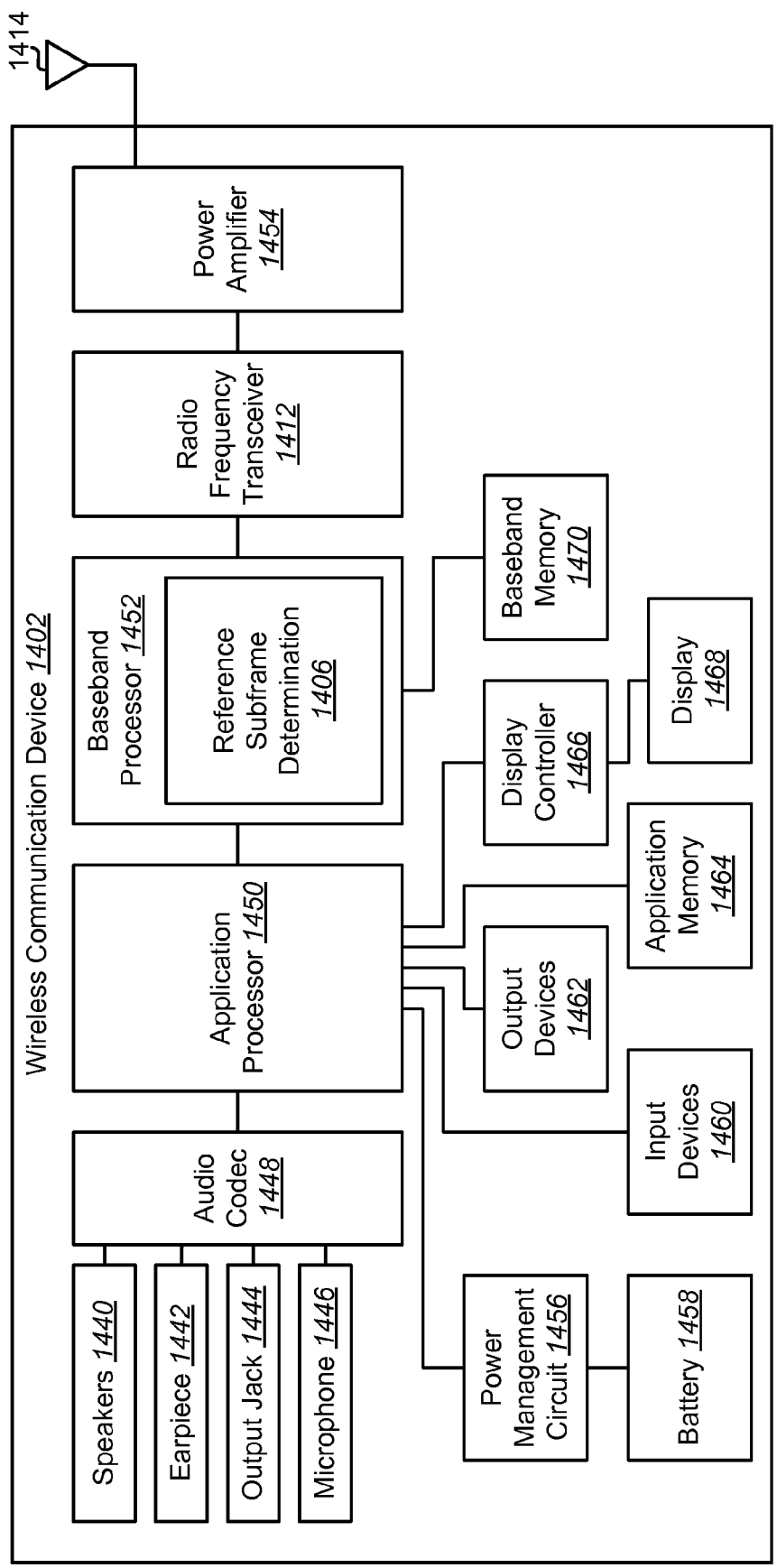
FIG. 14 is a block diagram illustrating one configuration of a wireless communication device in which systems and methods for determining a reference subframe may be implemented.

FIG. 14 is a block diagram illustrating one configuration of a wireless communication device 1402 in which systems and methods for determining a reference subframe may be implemented. The wireless communication device 1402 may be one example of the wireless communication device 102 described above. The wireless communication device 1402 may include an application processor 1450. The application processor 1450 generally processes instructions (e.g., runs programs) to perform functions on the wireless communication device 1402. The application processor 1450 may be coupled to an audio coder/decoder (codec) 1448.

The audio codec 1448 may be an electronic device (e.g., integrated circuit) used for coding and/or decoding audio signals. The audio codec 1448 may be coupled to one or more speakers 1440, an earpiece 1442, an output jack 1444 and/or one or more microphones 1446. The speakers 1440 may include one or more electro-acoustic transducers that convert electrical or electronic signals into acoustic signals. For example, the speakers 1440 may be used to play music or output a speakerphone conversation, etc. The earpiece 1442 may be another speaker or electro-acoustic transducer that can be used to output acoustic signals (e.g., speech signals) to a user. For example, the earpiece 1442 may be used such that only a user may reliably hear the acoustic signal. The output jack 1444 may be used for coupling other devices to the wireless communication device 1402 for outputting audio, such as headphones. The speakers 1440, earpiece 1442 and/or output jack 1444 may generally be used for outputting an audio signal from the audio codec 1448. The one or more microphones 1446 may be one or more acousto-electric transducers that convert an acoustic signal (such as a user's voice) into electrical or electronic signals that are provided to the audio codec 1448.

The application processor 1450 may also be coupled to a power management circuit 1456. One example of the power management circuit 1456 is a power management integrated circuit (PMIC), which may be used to manage the electrical power consumption of the wireless communication device 1402. The power management circuit 1456 may be coupled to a battery 1458. The battery 1458 may generally provide electrical power to the wireless communication device 1402.

The application processor 1450 may be coupled to one or more input devices 1460 for receiving input. Examples of input devices 1460 include infrared sensors, image sensors, accelerometers, touch sensors, keypads, etc. The input devices 1460 may allow user interaction with the wireless communication device 1402. The application processor 1450 may also be coupled to one or more output devices 1462. Examples of output devices 1462 include printers, projectors, screens, haptic devices, etc. The output devices 1462 may allow the wireless communication device 1402 to produce output that may be experienced by a user.

The application processor 1450 may be coupled to application memory 1464. The application memory 1464 may be any electronic device that is capable of storing electronic information. Examples of application memory 1464 include double data rate synchronous dynamic random access memory (DDRAM), synchronous dynamic random access memory (SDRAM), flash memory, etc. The application memory 1464 may provide storage for the application processor 1450. For instance, the application memory 1464 may store data and/or instructions for the functioning of programs that are run on the application processor 1450.

The application processor 1450 may be coupled to a display controller 1466, which in turn may be coupled to a display 1468. The display controller 1466 may be a hardware block that is used to generate images on the display 1468. For example, the display controller 1466 may translate instructions and/or data from the application processor 1450 into images that can be presented on the display 1468. Examples of the display 1468 include liquid crystal display (LCD) panels, light emitting diode (LED) panels, cathode ray tube (CRT) displays, plasma displays, etc.

The application processor 1450 may be coupled to a baseband processor 1452. The baseband processor 1452 generally processes communication signals. For example, the baseband processor 1452 may demodulate and/or decode received signals. Additionally or alternatively, the baseband processor 1452 may encode and/or modulate signals in preparation for transmission.

The baseband processor 1452 may include a reference subframe determination module 1406. The reference subframe determination module 1406 illustrated in FIG. 14 may be one example of the reference subframe determination module 106 illustrated in FIG. 1. The reference subframe determination module 1406 may be configured to perform one or more of the methods 300, 400, 500, 600, 700, 800, 900, 1000, 1100, 1200, 1300 described above.

The baseband processor 1452 may be coupled to baseband memory 1470. The baseband memory 1470 may be any electronic device capable of storing electronic information, such as SDRAM, DDRAM, flash memory, etc. The baseband processor 1452 may read information (e.g., instructions and/or data) from and/or write information to the baseband memory 1470. Additionally or alternatively, the baseband processor 1452 may use instructions and/or data stored in the baseband memory 1470 to perform communication operations.

The baseband processor 1452 may be coupled to a radio frequency (RF) transceiver 1412. The RF transceiver 1412 may be coupled to a power amplifier 1454 and one or more antennas 1414. The RF transceiver 1412 may transmit and/or receive radio frequency signals. For example, the RF transceiver 1412 may transmit an RF signal using a power amplifier 1454 and one or more antennas 1414. The RF transceiver 1412 may also receive RF signals using the one or more antennas 1414.

Figure 15:
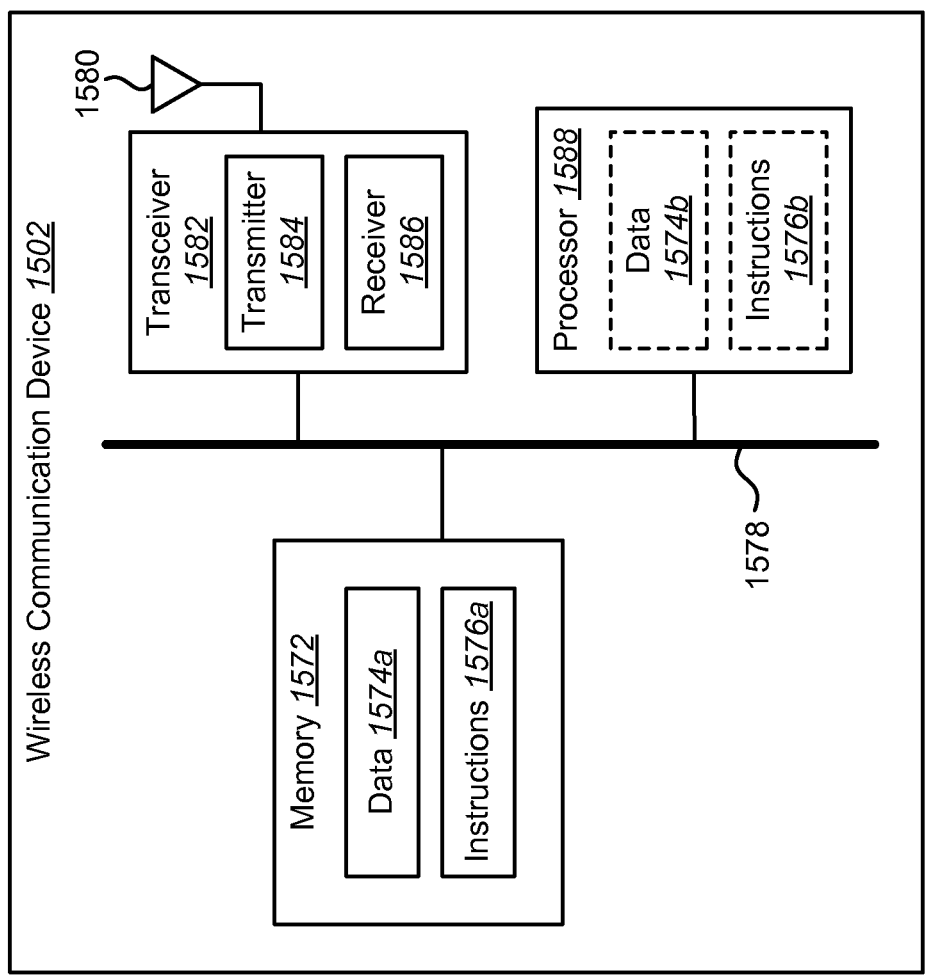
FIG. 15 illustrates certain components that may be included within a wireless communication device.

FIG. 15 illustrates certain components that may be included within a wireless communication device 1502. One or more of the wireless communication devices 102, 1402 described above may be configured similarly to the wireless communication device 1502 that is shown in FIG. 15. The wireless communication device 1502 includes a processor 1588. The processor 1588 may be a general purpose single- or multi-chip microprocessor (e.g., an ARM), a special purpose microprocessor (e.g., a digital signal processor (DSP)), a microcontroller, a programmable gate array, etc. The processor 1588 may be referred to as a central processing unit (CPU). Although just a single processor 1588 is shown in the wireless communication device 1502 of FIG. 15, in an alternative configuration, a combination of processors (e.g., an ARM and DSP) could be used.

The wireless communication device 1502 also includes memory 1572 in electronic communication with the processor 1588 (i.e., the processor 1588 can read information from and/or write information to the memory 1572). The memory 1572 may be any electronic component capable of storing electronic information. The memory 1572 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1574*a* and instructions 1576*a* may be stored in the memory 1572. The instructions 1576*a* may include one or more programs, routines, sub-routines, functions, procedures, etc. The instructions 1576*a* may include a single computer-readable statement or many computer-readable statements. The instructions 1576*a* may be executable by the processor 1588 to implement one or more of the methods that were described above. Executing the instructions 1576*a* may involve the use of the data 1574*a* that is stored in the memory 1572. FIG. 15 shows some instructions 1576*b* and data 1574*b* being loaded into the processor 1588.

The wireless communication device 1502 may also include a transmitter 1584 and a receiver 1586 to allow transmission and reception of signals between the wireless communication device 1502 and a remote location (e.g., a base station or other wireless communication device). The transmitter 1584 and receiver 1586 may be collectively referred to as a transceiver 1582. An antenna 1580 may be electrically coupled to the transceiver 1582. The wireless communication device 1502 may also include (not shown) multiple transmitters, multiple receivers, multiple transceivers and/or multiple antenna.

The various components of the wireless communication device 1502 may be coupled together by one or more buses, which may include a power bus, a control signal bus, a status signal bus, a data bus, etc. For simplicity, the various buses are illustrated in FIG. 15 as a bus system 1578.

Figure 16:
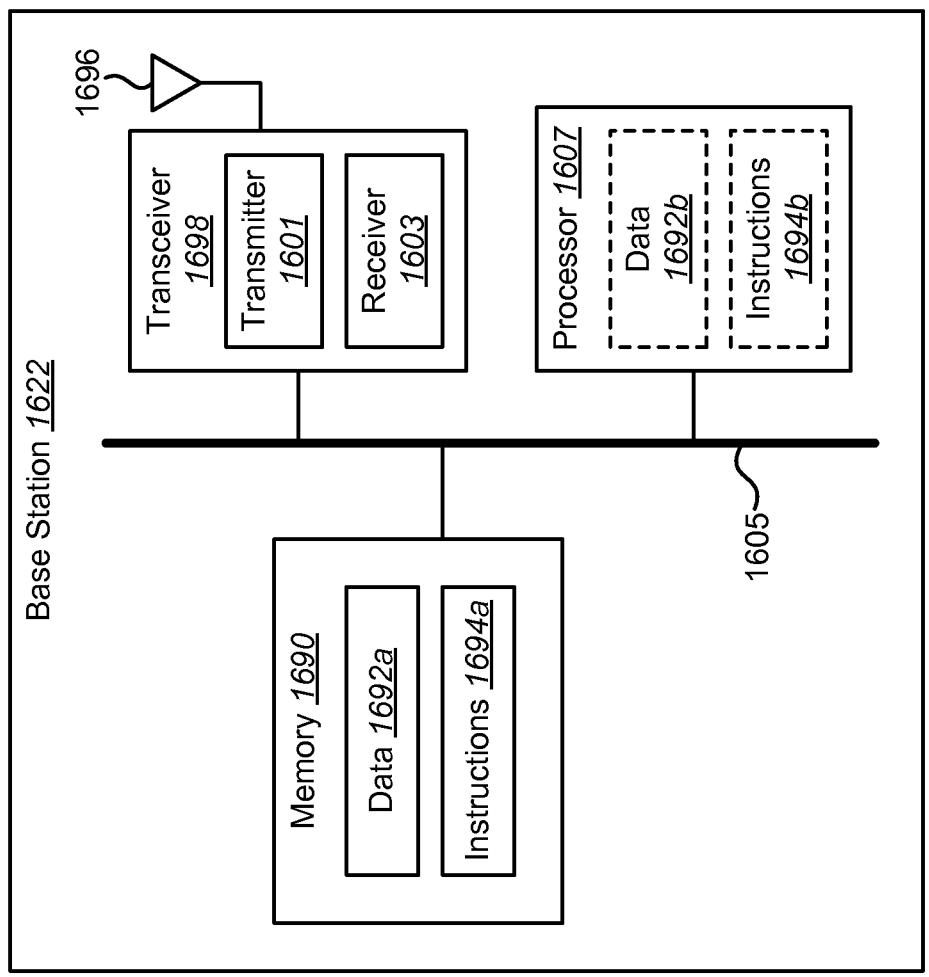
FIG. 16 illustrates certain components that may be included within a base station.

FIG. 16 illustrates certain components that may be included within a base station 1622. The base station 122 described above may be configured similarly to the base station 1622 shown in FIG. 16. The base station 1622 includes a processor 1607. The processor 1607 may be a general purpose single- or multi-chip microprocessor (e.g., an ARM), a special purpose microprocessor (e.g., a digital signal processor (DSP)), a microcontroller, a programmable gate array, etc. The processor 1607 may be referred to as a central processing unit (CPU). Although just a single processor 1607 is shown in the base station 1622 of FIG. 16, in an alternative configuration, a combination of processors (e.g., an ARM and DSP) could be used.

The base station 1622 also includes memory 1690 in electronic communication with the processor 1607 (i.e., the processor 1607 can read information from and/or write information to the memory 1690). The memory 1690 may be any electronic component capable of storing electronic information. The memory 1690 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1692*a* and instructions 1694*a* may be stored in the memory 1690. The instructions 1694*a* may include one or more programs, routines, sub-routines, functions, procedures, etc. The instructions 1694*a* may include a single computer-readable statement or many computer-readable statements. The instructions 1694*a* may be executable by the processor 1607. Executing the instructions 1694*a* may involve the use of the data 1692*a* that is stored in the memory 1690. FIG. 16 shows some instructions 1694*b* and data 1692*b* being loaded into the processor 1607.

The base station 1622 may also include a transmitter 1601 and a receiver 1603 to allow transmission and reception of signals between the base station 1622 and a remote location (e.g., a wireless communication device). The transmitter 1601 and receiver 1603 may be collectively referred to as a transceiver 1698. An antenna 1696 may be electrically coupled to the transceiver 1698. The base station 1622 may also include (not shown) multiple transmitters, multiple receivers, multiple transceivers and/or multiple antenna.

The various components of the base station 1622 may be coupled together by one or more buses, which may include a power bus, a control signal bus, a status signal bus, a data bus, etc. For simplicity, the various buses are illustrated in FIG. 16 as a bus system 1605.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless communication device for determining a reference subframe, comprising:
    a processor;
    memory in electronic communication with the processor;
    instructions stored in memory, the instructions being executable to:
        determine a reporting subframe n;
        determine a reference subframe $n-n_{reference}$ based on $n_{reference}$, a limit and at least one limiting criterion, wherein $n_{reference}$ is a difference in subframe number between the reporting subframe and the reference subframe, and wherein the limit limits a range of values for $n_{reference}$;
        determine a second reference subframe $n-n_{reference2}$ based on a second limit;
        generate a report based on the reference subframe if the reference subframe is determined; and
        send the report during the reporting subframe if the reference subframe is determined.

2. The wireless communication device of claim 1, wherein the limit is 4 and $n_{reference}$ is a smallest value greater than or equal to the limit that corresponds to a valid downlink subframe, and wherein the at least one limiting criterion comprises aperiodic triggering.

3. The wireless communication device of claim 2, wherein the at least one limiting criterion further comprises an upper limit.

4. The wireless communication device of claim 1, wherein the limit is L and $n_{reference}$ is a smallest value greater than or equal to the limit that corresponds to a valid downlink subframe, and wherein the at least one limiting criterion comprises limiting L to a difference between the reporting subframe n and a downlink control information subframe.

5. The wireless communication device of claim 4, wherein the at least one limiting criterion further comprises an upper limit.

6. The wireless communication device of claim 1, wherein the limit is 4 and $n_{reference}$ is a smallest value greater than or equal to the limit that corresponds to a valid downlink subframe, and wherein the at least one limiting criterion comprises limiting $n_{reference}$ to a value that is less than or equal to a difference between the reporting subframe n and a downlink control information subframe.

7. The wireless communication device of claim 1, wherein the limit is 4 and $n_{reference}$ is a smallest value greater than or equal to the limit that corresponds to a valid downlink subframe, and wherein the at least one limiting criterion comprises limiting $n_{reference}$ to a value such that $n-n_{reference}$ corresponds to a downlink control information subframe number or corresponds to a predetermined subframe number.

8. The wireless communication device of claim 1, wherein the limit is k and $n_{reference}$ is a smallest value greater than or equal to the limit that corresponds to a valid downlink subframe, and wherein the at least one limiting criterion comprises limiting $n_{reference}$ to a value that is less than or equal to a difference between the reporting subframe n and a downlink control information subframe.

9. The wireless communication device of claim 8, wherein k is greater than or equal to a minimum value.

10. The wireless communication device of claim 1, wherein the limit is k and $n_{reference}$ is a smallest value greater than or equal to the limit that corresponds to a valid downlink subframe, and wherein the at least one limiting criterion comprises a downlink subframe that comprises a channel state information reference signal.

11. The wireless communication device of claim 1, wherein the limit is $k_1$ and $n_{reference}$ is greater than or equal to the limit and corresponds to a first valid downlink subframe, and wherein the at least one limiting criterion comprises a channel state information reference signal, and wherein the second limit is $k_2$ and $n_{reference2}$ is greater than or equal to the second limit and corresponds to a second valid downlink subframe.

12. The wireless communication device of claim 1, wherein the limit is k and $n_{reference}$ is a smallest value greater than or equal to the limit that corresponds to a valid downlink subframe, and wherein the at least one limiting criterion comprises a downlink subframe that is a certain subframe type.

13. The wireless communication device of claim 1, wherein the limit is $k_1$ and $n_{reference}$ is a smallest value greater than or equal to the limit that corresponds to a valid downlink subframe of a certain subframe type, and wherein the at least one limiting criterion comprises using a downlink subframe of a certain type, and wherein the second limit is $k_2$ and $n_{reference2}$ is a value greater than or equal to the second limit that corresponds to a second valid downlink subframe.

14. A base station for determining a mode, comprising:
    a processor;
    memory in electronic communication with the processor;
    instructions stored in memory, the instructions being executable to:
        determine a feedback mode;
        send a feedback mode indicator, wherein the feedback mode indicator specifies a reference subframe determination mode for a wireless communication device to use that indicates whether to determine a second reference subframe in addition to a first reference subframe;
        send a reference signal; and
        receive feedback.

15. The base station of claim 14, wherein the reference signal is a common reference signal (CRS).

16. The base station of claim 14, wherein the reference signal is a channel state information reference signal (CSI-RS).

17. A method for determining a reference subframe on a wireless communication device, comprising:
  determining a reporting subframe n;
  determining a reference subframe n−$n_{reference}$ based on $n_{reference}$, a limit and at least one limiting criterion, wherein $n_{reference}$ is a difference in subframe number between the reporting subframe and the reference subframe, and wherein the limit limits a range of values for $n_{reference}$;
  determining a second reference subframe n−$n_{reference2}$ based on a second limit;
  generating a report based on the reference subframe if the reference subframe is determined; and
  sending the report during the reporting subframe if the reference subframe is determined.

18. The method of claim 17, wherein the limit is 4 and $n_{reference}$ is a smallest value greater than or equal to the limit that corresponds to a valid downlink subframe, and wherein the at least one limiting criterion comprises aperiodic triggering.

19. The method of claim 18, wherein the at least one limiting criterion further comprises an upper limit.

20. The method of claim 17, wherein the limit is L and $n_{reference}$ is a smallest value greater than or equal to the limit that corresponds to a valid downlink subframe, and wherein the at least one limiting criterion comprises limiting L to a difference between the reporting subframe n and a downlink control information subframe.

21. The method of claim 20, wherein the at least one limiting criterion further comprises an upper limit.

22. The method of claim 17, wherein the limit is 4 and $n_{reference}$ is a smallest value greater than or equal to the limit that corresponds to a valid downlink subframe, and wherein the at least one limiting criterion comprises limiting $n_{reference}$ to a value that is less than or equal to a difference between the reporting subframe n and a downlink control information subframe.

23. The method of claim 17, wherein the limit is 4 and $n_{reference}$ is a smallest value greater than or equal to the limit that corresponds to a valid downlink subframe, and wherein the at least one limiting criterion comprises limiting $n_{reference}$ to a value such that n−$n_{reference}$ corresponds to a downlink control information subframe number or corresponds to a predetermined subframe number.

24. The method of claim 17, wherein the limit is k and $n_{reference}$ is a smallest value greater than or equal to the limit that corresponds to a valid downlink subframe, and wherein the at least one limiting criterion comprises limiting $n_{reference}$ to a value that is less than or equal to a difference between the reporting subframe n and a downlink control information subframe.

25. The method of claim 24, wherein k is greater than or equal to a minimum value.

26. The method of claim 17, wherein the limit is k and $n_{reference}$ is a smallest value greater than or equal to the limit that corresponds to a valid downlink subframe, and wherein the at least one limiting criterion comprises a downlink subframe that comprises a channel state information reference signal.

27. The method of claim 17, wherein the limit is $k_1$ and $n_{reference}$ is greater than or equal to the limit and corresponds to a first valid downlink subframe, and wherein the at least one limiting criterion comprises a channel state information reference signal, and wherein the second limit is $k_2$ and $n_{reference2}$ is greater than or equal to the second limit and corresponds to a second valid downlink subframe.

28. The method of claim 17, wherein the limit is k and $n_{reference}$ is a smallest value greater than or equal to the limit that corresponds to a valid downlink subframe, and wherein the at least one limiting criterion comprises a downlink subframe that is a certain subframe type.

29. The method of claim 17, wherein the limit is $k_1$ and $n_{reference}$ is a smallest value greater than or equal to the limit that corresponds to a valid downlink subframe of a certain subframe type, and wherein the at least one limiting criterion comprises using a downlink subframe of a certain type, and wherein the second limit is $k_2$ and $n_{reference2}$ is a value greater than or equal to the second limit that corresponds to a second valid downlink subframe.

30. A method for determining a mode on a base station, comprising:
  determining a feedback mode;
  sending a feedback mode indicator, wherein the feedback mode indicator specifies a reference subframe determination mode for a wireless communication device to use that indicates whether to determine a second reference subframe in addition to a first reference subframe;
  sending a reference signal; and
  receiving feedback.

31. The method of claim 30, wherein the reference signal is a common reference signal (CRS).

32. The method of claim 30, wherein the reference signal is a channel state information reference signal (CSI-RS).

33. An apparatus for determining a reference subframe, comprising:
  means for determining a reporting subframe n;
  means for determining a reference subframe n−$n_{reference}$ based on $n_{reference}$, a limit and at least one limiting criterion, wherein $n_{reference}$ is a difference in subframe number between the reporting subframe and the reference subframe, and wherein the limit limits a range of values for $n_{reference}$;
  means for determining a second reference subframe n−$n_{reference2}$ based on a second limit;
  means for generating a report based on the reference subframe if the reference subframe is determined; and
  means for sending the report during the reporting subframe if the reference subframe is determined.

34. The apparatus of claim 33, wherein the limit is 4 and $n_{reference}$ is a smallest value greater than or equal to the limit that corresponds to a valid downlink subframe, and wherein the at least one limiting criterion comprises aperiodic triggering.

35. The apparatus of claim 33, wherein the limit is L and $n_{reference}$ is a smallest value greater than or equal to the limit that corresponds to a valid downlink subframe, and wherein the at least one limiting criterion comprises limiting L to a difference between the reporting subframe n and a downlink control information subframe.

36. The apparatus of claim 33, wherein the limit is k and $n_{reference}$ is a smallest value greater than or equal to the limit that corresponds to a valid downlink subframe, and wherein the at least one limiting criterion comprises limiting $n_{reference}$ to a value that is less than or equal to a difference between the reporting subframe n and a downlink control information subframe.

37. The apparatus of claim 33, wherein the limit is $k_1$ and $n_{reference}$ is greater than or equal to the limit and corresponds to a first valid downlink subframe, and wherein the at least one limiting criterion comprises a channel state information reference signal, and wherein the second limit is $k_2$ and $n_{reference2}$ is greater than or equal to the second limit and corresponds to a second valid downlink subframe.

38. An apparatus for determining a mode, comprising:
means for determining a feedback mode;
means for sending a feedback mode indicator, wherein the feedback mode indicator specifies a reference subframe determination mode for a wireless communication device to use that indicates whether to determine a second reference subframe in addition to a first reference subframe;
means for sending a reference signal; and
means for receiving feedback.

39. The apparatus of claim 38, wherein the reference signal is a common reference signal (CRS).

40. The apparatus of claim 38, wherein the reference signal is a channel state information reference signal (CSI-RS).

41. A computer-program product for determining a reference subframe, comprising a non-transitory tangible computer-readable medium having instructions thereon, the instructions comprising:
code for causing a wireless communication device to determine a reporting subframe n;
code for causing the wireless communication device to determine a reference subframe $n-n_{reference}$ based on $n_{reference}$, a limit and at least one limiting criterion, wherein $n_{reference}$ is a difference in subframe number between the reporting subframe and the reference subframe, and wherein the limit limits a range of values for $n_{reference}$;
code for causing the wireless communication device to determine a second reference subframe $n-n_{reference2}$ based on a second limit;
code for causing the wireless communication device to generate a report based on the reference subframe if the reference subframe is determined; and
code for causing the wireless communication device to send the report during the reporting subframe if the reference subframe is determined.

42. The computer-program product of claim 41, wherein the limit is 4 and $n_{reference}$ is a smallest value greater than or equal to the limit that corresponds to a valid downlink subframe, and wherein the at least one limiting criterion comprises aperiodic triggering.

43. The computer-program product of claim 41, wherein the limit is L and $n_{reference}$ is a smallest value greater than or equal to the limit that corresponds to a valid downlink subframe, and wherein the at least one limiting criterion comprises limiting L to a difference between the reporting subframe n and a downlink control information subframe.

44. The computer-program product of claim 41, wherein the limit is k and $n_{reference}$ is a smallest value greater than or equal to the limit that corresponds to a valid downlink subframe, and wherein the at least one limiting criterion comprises limiting $n_{reference}$ to a value that is less than or equal to a difference between the reporting subframe n and a downlink control information subframe.

45. The computer-program product of claim 41, wherein the limit is $k_1$ and $n_{reference}$ is greater than or equal to the limit and corresponds to a first valid downlink subframe, and wherein the at least one limiting criterion comprises a channel state information reference signal, and wherein the second limit is $k_2$ and $n_{reference2}$ is greater than or equal to the second limit and corresponds to a second valid downlink subframe.

46. A computer-program product for determining a mode, comprising a non-transitory tangible computer-readable medium having instructions thereon, the instructions comprising:
code for causing a base station to determine a feedback mode;
code for causing the base station to send a feedback mode indicator, wherein the feedback mode indicator specifies a reference subframe determination mode for a wireless communication device to use that indicates whether to determine a second reference subframe in addition to a first reference subframe;
code for causing the base station to send a reference signal; and
code for causing the base station to receive feedback.

47. The computer-program product of claim 46, wherein the reference signal is a common reference signal (CRS).

48. The computer-program product of claim 46, wherein the reference signal is a channel state information reference signal (CSI-RS).

* * * * *